US010458396B2

(12) United States Patent
Philipsen et al.

(10) Patent No.: US 10,458,396 B2
(45) Date of Patent: Oct. 29, 2019

(54) DE-ICING SYSTEM FOR A WIND TURBINE BLADE

(71) Applicant: LM WP PATENT HOLDING A/S, Kolding (DK)

(72) Inventors: Morten Philipsen, Kolding (DK); John Korsgaard, Kolding (DK); David Killick, Kolding (DK)

(73) Assignee: LM WP PAGENT HOLDING A/S, Kolding (DK)

( * ) Notice: Subject to any disclaimer, the term of this patent is extended or adjusted under 35 U.S.C. 154(b) by 426 days.

(21) Appl. No.: 15/506,430

(22) PCT Filed: Sep. 2, 2015

(86) PCT No.: PCT/EP2015/070035
§ 371 (c)(1),
(2) Date: Feb. 24, 2017

(87) PCT Pub. No.: WO2016/034614
PCT Pub. Date: Mar. 10, 2016

(65) Prior Publication Data
US 2017/0254316 A1 Sep. 7, 2017

(30) Foreign Application Priority Data

Sep. 2, 2014 (EP) ..................................... 14183144

(51) Int. Cl.
*F03D 80/40* (2016.01)
*F03D 1/06* (2006.01)
(52) U.S. Cl.
CPC .............. *F03D 80/40* (2016.05); *F03D 1/065* (2013.01); *F03D 1/0608* (2013.01);
(Continued)
(58) Field of Classification Search
CPC ....................................................... F03D 80/40
See application file for complete search history.

(56) References Cited

U.S. PATENT DOCUMENTS 2,320,870 A * 6/1943 Johnson ................. B64D 15/02
244/123.8
2,510,170 A * 6/1950 Chillson ................ B64D 15/02
244/134 B
(Continued)

FOREIGN PATENT DOCUMENTS

CN         102748243 A    10/2012
DE   10 2010 030 472 A1   12/2011
(Continued)

OTHER PUBLICATIONS

International Search Report dated Nov. 20, 2015 issued in corresponding International Application No. PCT/EP2015/070035.

*Primary Examiner* — Woody A Lee, Jr.
(74) *Attorney, Agent, or Firm* — Nath, Goldberg & Meyer; Tanya E. Harkins

(57) ABSTRACT

A wind turbine blade is described having a de-icing system which is arranged to heat at least a portion of the leading edge of the wind turbine blade, to prevent the formation of ice on the blade, or to remove any existing surface ice. The de-icing system comprises insulated flow channels which are arranged to circulate a heated fluid from a heating element to the tip end of the blade, and to de-ice the blade leading edge starting from the tip end towards the root end of the blade. The de-icing system is arranged to operate in the outboard portion of the blade, where the de-icing effect provides the most benefits to turbine operation. Further features of the de-icing system include an improved mounting arrangement of the de-icing system, an improved tip end configuration of the de-icing system, and providing portions of the de-icing system as double-walled inflatable insulating tubes.

25 Claims, 16 Drawing Sheets

(52) U.S. Cl.
CPC ...... *F03D 1/0633* (2013.01); *F05B 2240/301* (2013.01); *F05B 2250/291* (2013.01); *F05B 2260/202* (2013.01); *F05B 2270/303* (2013.01); *Y02E 10/721* (2013.01)

(56) References Cited

U.S. PATENT DOCUMENTS

| | | | | |
|---|---|---|---|---|
| 2,556,736 | A | * | 6/1951 | Palmatier ............... B64D 15/02 239/76 |
| 6,676,122 | B1 | * | 1/2004 | Wobben ................. F03D 80/60 290/55 |
| 8,029,239 | B2 | * | 10/2011 | Luetze ................... F03D 15/05 416/91 |
| 2004/0041408 | A1 | * | 3/2004 | Casazza ................. F03D 80/60 290/55 |
| 2013/0101414 | A1 | * | 4/2013 | Weitkamp ............. F03D 1/0675 416/1 |
| 2013/0106108 | A1 | | 5/2013 | De Boer et al. |

FOREIGN PATENT DOCUMENTS

| | | |
|---|---|---|
| DE | 10 2010 051 292 A1 | 5/2012 |
| WO | 2013/107457 A1 | 7/2013 |

\* cited by examiner

DE-ICING SYSTEM FOR A WIND TURBINE BLADE

This is a National Phase Application filed under 35 U.S.C. 371 as a national stage of PCT/EP2015/070035, filed Sep. 2, 2015, an application claiming the benefit of European Application No. 14183144.6, filed Sep. 2, 2014, the content of each of which is hereby incorporated by reference in its entirety.

FIELD OF THE INVENTION

The present invention relates to a de-icing system for a wind turbine blade.

BACKGROUND OF THE INVENTION

When wind turbines are operated in cold-weather climates, the potential build-up of ice on the wind turbine blades presents challenges for turbine performance. In a first aspect, any ice formation on the blade surfaces will disrupt the blade aerodynamics, which may lead to a reduction in turbine efficiency and/or increased operational noise levels. In a further aspect, ice which breaks away from blade surfaces can present a falling hazard. In this regard, wind turbine blades in such locations are often provided with systems to deliver ice prevention and/or removal.

In addition to electrical heating systems embedded in blades and mechanical de-icing systems, it is known to provide hot-air de-icing systems which operate on the principle of supplying heated air to the interior of a wind turbine blade, to raise the surface temperature of the blade to above freezing. An example of such a hot-air de-icing system can be seen in US Patent Application Publication No. US 2013/0106108.

However, such prior art hot air systems are often inefficient, and can require large amounts of energy to ensure that ice is prevented from forming at the tip end of the wind turbine blades, where the impact of any ice formation on the blade aerodynamics is most significant. Furthermore, the use of such hot air systems can introduce additional complications in terms of increased blade weight and/or structural strain, which can affect the practicability of such solutions.

It is an object of the invention to provide a de-icing system that provides improved performance over the prior art.

SUMMARY OF THE INVENTION

Accordingly, there is provided a wind turbine blade having a blade de-icing system, the wind turbine blade comprising a root end and a tip end, a leading edge and a trailing edge, the blade having an outboard portion provided towards said tip end and an inboard portion provided towards said root end, the blade de-icing system arranged to convey a heated fluid to provide heat to portions of the wind turbine blade, wherein the blade de-icing system comprises:
- an insulated outflow channel flowing from said root end to a location adjacent said tip end;
- a heating channel in the outboard portion of the blade, the heating channel flowing from said location adjacent said tip end along the leading edge of the blade in the outboard portion of blade; and
- an insulated return channel in the inboard portion of the blade, the insulated return channel extending from the root end side of the heating channel to the root end of the blade, wherein said de-icing system is arranged to convey heated fluid from said root end through said outflow channel to said tip end, and from said tip end through said heating channel and said insulated return channel to said root end, said de-icing system configured to heat the leading edge of the blade in said outboard portion of the blade.

In this system, the outboard portion of the blade is heated from the tip end back along the length of the outboard portion, and then returned via an insulated channel to reduce heat loss in system, and provide for a more efficient de-icing system. By insulating the outflow channel of the de-icing system from the root end to the tip end of the blade, accordingly the working fluid, preferably heated air, is maintained at a high temperature until it reaches the heating channel at the tip end of the blade. As a result, the working fluid starts to heats the leading edge of the blade from a location at or near the tip end of the blade, with the fluid at the highest temperature for the outermost sections of the blade, where the de-icing operation has the greatest impact on the blade and turbine performance. As a result, the de-icing of the outermost areas of the blade is not affected by any heat loss due to heating of the relatively more inboard sections of the blade.

It will be understood that, within the outboard portion of the blade, the system may be configured to provide for a substantially simultaneous heating of the de-icing zone of the outboard section of the blade, e.g. through the use of suitable tubes or flow diverters. Accordingly, ice may be removed from the entire outboard portion of the blade substantially simultaneously.

As the initial ice sheet may provide an insulating effect along the leading edge of the blade, accordingly the deposited ice may act to prevent initial heat loss from the de-icing system. Performing a simultaneous de-icing of the blade surface can mean that the heat loss from the de-icing system is controlled, as the surface of the blade relatively simultaneously transitions from an iced surface, having a relatively low heat loss level, to an exposed surface, having a relatively high heat loss level, at which point the de-icing system can be turned off or run at reduced intensity.

The heating channel may be a channel defined by at least one insulating wall, or may comprise a heating chamber or cavity defined by the internal structure of the wind turbine blade, and arranged to heat a portion of the leading edge of the wind turbine blade. It will be understood that the heating channel may be defined by the internal structural elements of the wind turbine blade, e.g. a shear web, a blade shell wall, etc.

In one aspect, the outflow channel may be provided by an insulated channel extending along substantially the entire length of the wind turbine blade, from the root end to the tip end. In an alternative aspect, the outflow channel may be defined as an insulated channel extending from said root end to a first location along the length of the blade, and wherein the outflow channel is further formed by a space or cavity defined by blade structural elements from said first location to the tip end of the blade. The blade structural elements may comprise a spar box, shear webs, and/or blade shell sections. It will be understood that portions of the blade structural elements may be treated with an insulating material to prevent heat loss from the de-icing system. It will further be understood that such insulation may be applied to limited sections of the blade, e.g. on the surface of a trailing-edge-side shear web or section of a spar box.

In one aspect, the heating channel may comprise a structure defined within the wind turbine blade. It will be understood that the heating channel may alternatively comprise the space or cavity defined between a leading-edge-side shear web and the leading edge of a wind turbine blade shell.

In an additional or alternative aspect, the heating channel may comprise at least one bulkhead element. Said at least one bulkhead element can be arranged to provide support for the heating channel and/or the leading edge geometry of the blade. It will be understood that said at least one bulkhead is provided with apertures to allow for the heating fluid to circulate through the heating channel. The at least one bulkhead may be formed from any suitable material, preferably an insulating material, e.g. low-density foam such as low-density polyurethane foam. It will be understood that the de-icing system may comprise insulating walls, elements or coatings comprising polychloroprene or any other suitable synthetic rubber material.

In one aspect, the outboard portion comprises the outer half of the wind turbine blade, towards the tip end. In an alternative aspect, the outboard portion comprises the outer one-third of the wind turbine blade, towards the tip end. In a further alternative aspect, the outboard portion comprises the outer two-thirds of the wind turbine blade, towards the tip end.

Preferably, the wind turbine blade comprises at least one internal shear web extending between opposed internal surfaces of the wind turbine blade, wherein said insulated outflow channel is mounted solely to said at least one internal shear web. Additionally or alternatively, said insulated return channel is mounted solely to at least one internal shear web of said wind turbine blade.

By mounting the outflow channel and/or the return channel to the shear web, which is provided as a reinforcing structural element of the blade, accordingly the effect on the structural loading of the blade is minimized, with little or no impact on the blade outer shell.

Preferably, the wind turbine blade comprises a blade shell structure forming the outer surface of the wind turbine blade, wherein said insulated outflow channel is spaced from the internal surfaces of said blade shell structure. Additionally or alternatively, said insulated return channel is spaced from the internal surfaces of said blade shell structure.

As the surface of the blade may bend and flex during turbine operation, by spacing the outflow channel and/or the return channel from the blade shell itself, the effect of the de-icing system on any possible bending of the blade shell is reduced.

Preferably, the wind turbine blade comprises a blade shell structure forming the outer surface of the wind turbine blade, wherein said heating channel comprises:
   an insulated wall arranged to define a leading edge cavity between said insulated wall and an internal surface of said blade shell structure at the leading edge of the blade in said outboard portion, and
   flexible seal members arranged between respective upper and lower sides of said insulated wall and respective adjacent portions of the internal surface of said blade shell structure,
   wherein said insulated wall is supported by an internal shear web of said wind turbine blade, and
   wherein said flexible seal members are non-load carrying members, and act to isolate the forces associated with said insulated wall from the internal surface of said blade shell structure at said heating channel.

The insulated wall is supported by the internal shear web, thereby transferring the structural forces and rigidity associated with the insulating wall to the reinforcing elements of the blade structure. The use of the flexible seal members can be arranged to deform and absorb any bending or relative movement between the blade shell structure and the insulating wall at the heating channel, thereby ensuring that the use of the insulating wall of the de-icing system does not significantly impact on the structural forces experienced by the blade shell structure during turbine operation, reducing the risk of shell failure or cracking through use of the de-icing system.

In an additional or alternative aspect, the heating channel comprises:
   an insulated wall arranged to define a leading edge cavity between said insulated wall and an internal surface of said blade shell structure at the leading edge of the blade in said outboard portion, wherein said insulated wall comprises a curved profile, preferably wherein said curved insulated wall substantially corresponds to the internal surface of said blade shell structure at the leading edge of the blade in said outboard portion, wherein said curved insulated wall is supported by an internal shear web of said wind turbine blade. Preferably, said insulated wall is formed from an insulating material, e.g. a synthetic rubber, e.g. polychloroprene.

In one aspect, the heating channel can be arranged to heat an area of the surface of the wind turbine blade approximately 10% of the chord length of the blade from the leading edge of the wind turbine blade.

In this aspect, the zone of the blade heated by the de-icing system comprises the area adjacent the blade leading edge, where the impact of any ice formation has the greatest effect on blade performance. Preferably, the insulated wall is accordingly located extending between opposed portions of the internal surface of the wind turbine blade at 10% chord from the leading edge of the blade.

Preferably, said insulated outflow channel is arranged between a leading edge shear web and a trailing edge shear web of a wind turbine blade. Additionally or alternatively, said insulated outflow channel is arranged in the interior of a spar box for a wind turbine blade.

It will be understood that a portion of a shear web or a spar box may be treated with an insulating material, to prevent heat loss into and/or through the said portion. For example, a surface of a shear web or spar box may be laminated with a layer of insulation, an insulating spray or gel, etc. Preferably, the insulating material is lightweight and/or flexible, so as not to impact on the structural characteristics of the shear web or spar box.

Preferably, the wind turbine blade comprises at least one diverter tube provided as part of said de-icing system, wherein said at least one diverter tube extends from said insulated outflow channel to said heating channel. Additionally or alternatively, the wind turbine blade comprises at least one fluid flow aperture, wherein said at least one fluid flow aperture provides a fluid passage between said outflow channel and said heating channel.

Preferably, the wind turbine blade comprises an array of diverter tubes and/or fluid flow apertures extending between said insulated outflow channel to said heating channel along the length of said outboard portion, wherein said diverter tubes and/or fluid flow apertures are arranged to convey a heated fluid from said insulated outflow channel to said heating channel.

By providing diverter tubes and/or fluid flow apertures between the outflow channel and the heating channel, the working fluid can be easily conveyed from the insulated portion of the de-icing system to the area most in need of de-icing.

In a preferred aspect, at least one diverter tube extends into a leading edge cavity defined by said heating channel. Preferably, the at least one diverter tube comprises an outlet arranged closely adjacent the internal surface of the wind turbine blade in said leading edge cavity, wherein said at least one diverter tube is arranged to convey a heated fluid from said outflow channel to an area adjacent the internal surface of the wind turbine blade in said leading edge cavity.

Preferably, the at least one diverter tube is arranged wherein the outlet of the diverter tube is located closely adjacent to the absolute leading edge of the wind turbine blade.

By providing diverter tubes which extend into the heating channel itself, and which preferably end immediately adjacent the leading edge of the blade, accordingly the heated fluid is more directly conveyed to the internal surface of the blade at the leading edge, thereby ensuring that the fluid reaches the leading edge of the blade at the highest temperature of the fluid, improving the efficiency of the de-icing system.

In a preferred aspect, the wind turbine blade comprises at least one actuatable valve provided with at least one of said diverter tubes and/or fluid flow apertures, wherein said at least one actuatable valve is operable to control a flow of heated fluid from said insulated outflow channel to said heating channel.

Allowing for control of the flow through the diverter tubes and/or fluid flow apertures means that the conveying of fluid from the outflow channel to the heating channel can be controlled, dependent on the de-icing conditions. Preferably, the valves are initially closed, and are opened in sequence moving from the tip end along the length of the outboard portion, such that the de-icing performance of the de-icing system is adjusted to initially provide for a relatively high de-icing effect at the tip end, and which can be spread to the other regions back along the length of the blade, by the opening and/or closing of appropriate valves.

Preferably, said at least one actuatable valve comprises a temperature-controlled valve.

In an embodiment of the invention said insulated outflow channel is arranged in a space between said leading edge shear web (12a) and said trailing edge shear web (12b) in the outboard portion of the blade, wherein heated fluid is conveyed to said heating channel through apertures (100) in said leading edge shear web (12a).

According to these embodiments the space between the leading edge- and trailing edge shear webs is utilized as outflow channel in the outboard section. By providing apertures in the leading edge shear web, heated fluid is conveyed to the heating channel and is available for heating the leading edge of the blade. In this way an improved utilization of the energy provided by the heated fluid may be obtained.

In an embodiment of the invention said insulated outflow channel is formed having a decreasing cross-sectional area in the direction from said root end (16) towards said tip end (14), wherein said insulated outflow channel has a plurality of apertures (106) extending from said outflow channel to said heating channel (72), and wherein said insulated outflow channel is arranged on or near said at least one shear web (12a) and facing the leading edge (18).

According to these embodiments the geometry of the outflow channel may provide a more uniform distribution of energy provided by the heated fluid. The decreasing cross sectional area of the outflow channel increases the speed of the fluid in the channel towards the tip end, thereby at least partly compensating for the pressure drop in the channel due to the apertures.

In an embodiment of the invention the insulated outflow channel is formed having a substantially circular cross-section, the diameter of the insulated outflow channel being between 300 and 500 mm at the end facing the root end (16) and between 50 and 250 mm at the end facing the tip end (14).

According to these embodiments a tubular outflow cannel is used and the diameter of the outflow channel is decreased towards the tip end of the blade. The relative decrease in diameter may be optimized to effectively utilize the energy provided by the heated fluid for heating portions of the leading edge of the blade.

In an embodiment of the invention the apertures (106) decrease with respect to their cross sectional area towards the tip end (14)

In an embodiment of the invention a heating- and circulation apparatus (80) is connected to the outflow channel (70) by a flexible hose (105) and a reduction unit (106) and to the return channel (78) by a flexible hose (105) and a reduction unit (106), said flexible hoses (105) being connected to said heating- and circulation apparatus and said reduction units (106), said reduction units (106) being connected to the outflow- and return channels, respectively.

According to these embodiments flexible hoses are used to connect the outflow- and return channels to the heating- and circulation apparatus. This has the advantage that any relative movements of the channels with respect to the apparatus are compensated for by the flexibility of the hoses. Furthermore, the connections via reduction units accelerate the flow of fluid into the outflow channel and decelerate the flow from the return channel into the apparatus. This may result in a more efficient utilization of the heat provided by the apparatus.

In an embodiment of the invention said insulated outflow channel and/or said insulated return cannel comprise filtering units (107).

According these embodiments one or more filters are installed in the channels to remove particles from the fluid. Within the cavity inside the blade, solid material may be worn of or detach from surfaces. To secure the function of the de-icing system, it may be advantageous to remove such debris by filtering the fluid stream circulated in the blade. The filter(s) may be checked and changed during regular service.

In one embodiment, said insulated outflow channel, and/or said insulated return channel, is formed from insulating panels, preferably low density foam panels, which are arranged to form a tube or box-like channel structure. Preferably, said insulating panels are assembled to form a structure, the panels attached together using an adhesive bonding, a mechanical connector, and/or by laminating the panel to form said structure.

Additionally or alternatively, said insulated outflow channel, and/or said insulated return channel, may be formed from a flexible insulated material.

Preferably, said outflow channel and/or said return channel are formed as a double-walled inflatable tube, the tube comprising an inner tube arranged to convey a heated fluid and an outer tube, said inner tube located within the interior of said outer tube, an insulating cavity defined between said inner tube and said outer tube, wherein said insulating cavity in provided with an insulating fluid, to prevent heat loss from any heated fluid conveyed in said inner tube.

Preferably, said insulating fluid comprises an inert gas, e.g. argon, but it will be understood that atmospheric air may be used as the insulating fluid. In one aspect, the insulating fluid may comprise a mixture of an inert gas and air.

Preferably, said inner tube and/or said outer tube are formed from a substantially impermeable flexible material, e.g. rubber, latex, polychloroprene, nylon fabric, tarpaulin, plastic sheeting, cellulose acetate, polyester fabric, polyethylene, polypropylene, polytetrafluoro ethylene, polyvinyl chloride, vinylchloride acetate, preferably a waterproof material, or a material treated to improve the impermeability of the material, e.g. by applying a coating, for example a PVC coating.

Providing insulated channels formed from flexible material which can be inflated with an insulating fluid allows for the components of the de-icing system to be relatively easily manufactured without requiring high degrees of accuracy. In addition, due to the inflatable nature of the channels, the components can be easily transported in an un-inflated state from a manufacturing location to a location for installation in a wind turbine blade, where the channels can be inflated during or after installation in the blade.

Furthermore, it will be understood that the inflation of the insulated channels may be performed at the time of manufacture and assembly of the wind turbine blade having such a de-icing system, the channels then sealed to retain the insulating fluid.

Additionally or alternatively, the inflation of the channels may be performed when a de-icing operation is executed, or is predicted to occur.

By only inflating the channels for periods where the de-icing system is active or is expected to be active, accordingly the efficiency of the de-icing system and the general operation of the wind turbine blade can be improved. In one aspect, the de-icing system may experience reduced losses of insulating fluid from the system as opposed to a system wherein the insulating fluid is retained in the channels for the lifetime of the wind turbine blade. In a further aspect, any structural effects on the wind turbine blade which may result from the inflation of the channels can be confined to the occurrence of de-icing events, and have no impact on the performance of the wind turbine blade outside of such de-icing events.

In an additional or alternative aspect, there is provided a wind turbine blade comprising a root end and a tip end, a leading edge and a trailing edge, the wind turbine blade further comprising a blade de-icing system arranged to convey a heated fluid to provide heat to portions of the wind turbine blade, wherein the blade de-icing system comprises:
an insulated outflow channel arranged to convey a heated fluid from said root end to a location adjacent said tip end; and
a heating channel arranged adjacent the leading edge of the blade, the heating channel communicatively coupled with said insulated outflow channel to convey heated fluid from said outflow channel to heat the leading edge of the blade,
wherein the blade de-icing system further comprises at least one baffle provided in said heating channel, to re-direct a portion of a flow of heated fluid in said heating channel.

By providing a baffle or other suitable flow diversion barrier in the de-icing system, accordingly the flow of heated fluid in the de-icing system can be controlled and adjusted as required. Preferably, the flow of heated fluid is re-directed in order to improve the efficiency of the de-icing system of the blade.

In one aspect, said insulated outflow channel is communicatively coupled with said heating channel at said tip end, wherein said at least one baffle defines at least one supplementary channel in said heating channel, wherein said at least one supplementary channel extends to a location in said heating channel spaced from said tip end, to divert a portion of a flow of heated fluid from said insulated outflow channel to said location spaced from said tip end.

If the outflow channel and the heating channel are connected at the tip end, then the heated fluid is conveyed to the heating channel at the tip end. The use of a flow diverting baffle to divert a portion of this flow to a location spaced from the tip end allows for some of the heated fluid to be redirected to a secondary location, such that the heated fluid reaches the leading edge of the blade at said secondary location without significant heat losses. Accordingly, the de-icing operation of the blade de-icing system can be improved, as heat losses of the heated fluid can be minimized prior to the heating of the blade leading edge.

Preferably, said at least one supplementary channel extends to a location in said heating channel approximately 5% of the blade length from said tip end, to divert a portion of a flow of heated fluid from said insulated outflow channel to said location approximately 5% of the blade length from said tip end.

It will be understood that a plurality of flow diverting baffles may be used to form a plurality of supplementary channels, spaced at different locations along the length of the heating channel from the tip end of the blade.

In an alternative aspect, said insulated outflow channel is communicatively coupled with said heating channel at a location spaced from said tip end, wherein said at least one baffle defines at least one supplementary channel in said heating channel, wherein said at least one supplementary channel extends from said location in said heating channel spaced from said tip end to a location adjacent the tip end of the blade, wherein the at least one baffle acts to divert a portion of a flow of heated fluid from said insulated outflow channel to the tip end of the blade.

In some blade constructions, the fluid connection between the insulated outflow channel and the heating channel may not be located at the tip end of the blade, e.g. due to the structural considerations of providing an aperture or a passage in an internal shear web of a blade. In such embodiments, an insulated flow diverter or can be used to re-direct a portion of the heated fluid from the location where the outflow channel is connected to the heating channel to a location at the blade tip, where the de-icing of the blade provides the greatest benefit to blade performance.

Preferably, the outflow channel is connected to said heating channel at a location approximately 5% of the blade length from the tip end of the blade, wherein said at least one baffle is arranged to divert a portion of a flow of heated fluid from said location approximately 5% of the blade length from the blade tip to a location at said blade tip.

DESCRIPTION OF THE INVENTION

Embodiments of the invention will now be described, by way of example only, with reference to the accompanying drawings, in which:
FIG. 1 shows a wind turbine;
FIG. 2 shows a schematic view of a wind turbine blade according to the invention;
FIG. 3 shows a schematic view of an airfoil profile of the blade of FIG. 2;

Figure 1:
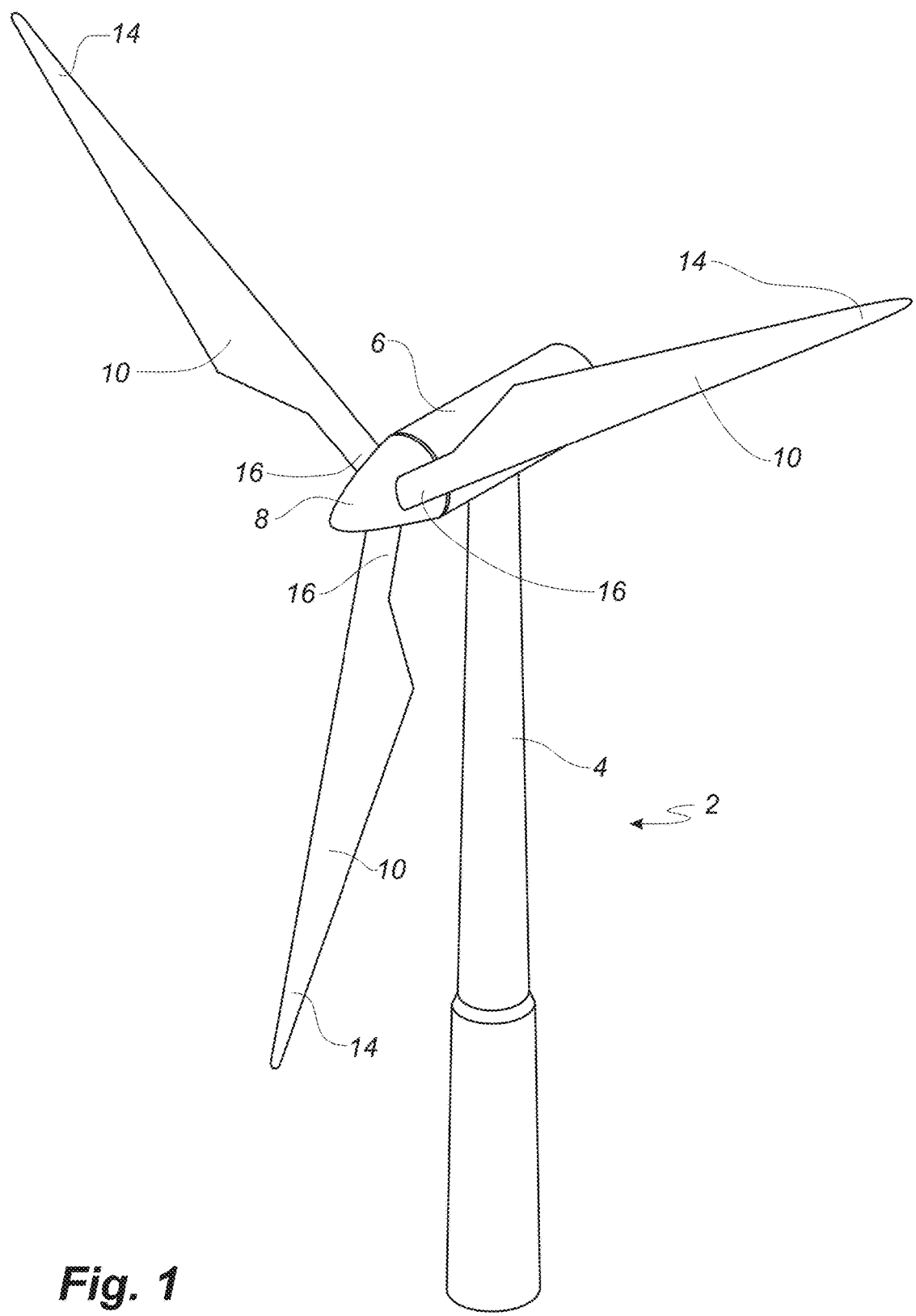

It will be understood that elements common to the different embodiments of the invention have been provided with the same reference numerals in the drawings. It will be further understood that individual features shown in the different embodiments of the invention are not limited to those specific embodiments only, and may be reproduced appropriately in any of the other shown embodiments.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
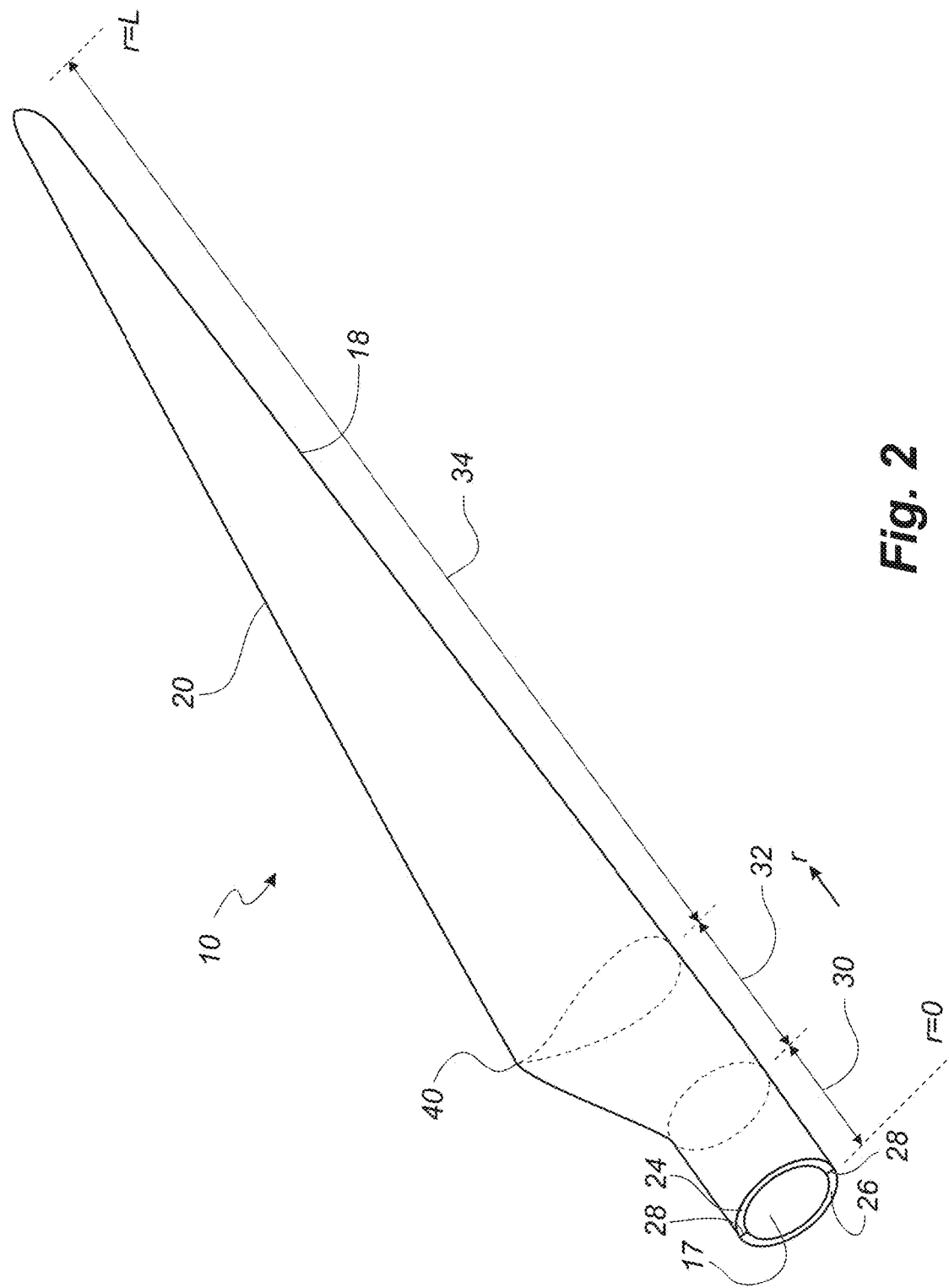

FIG. 2 shows a schematic view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
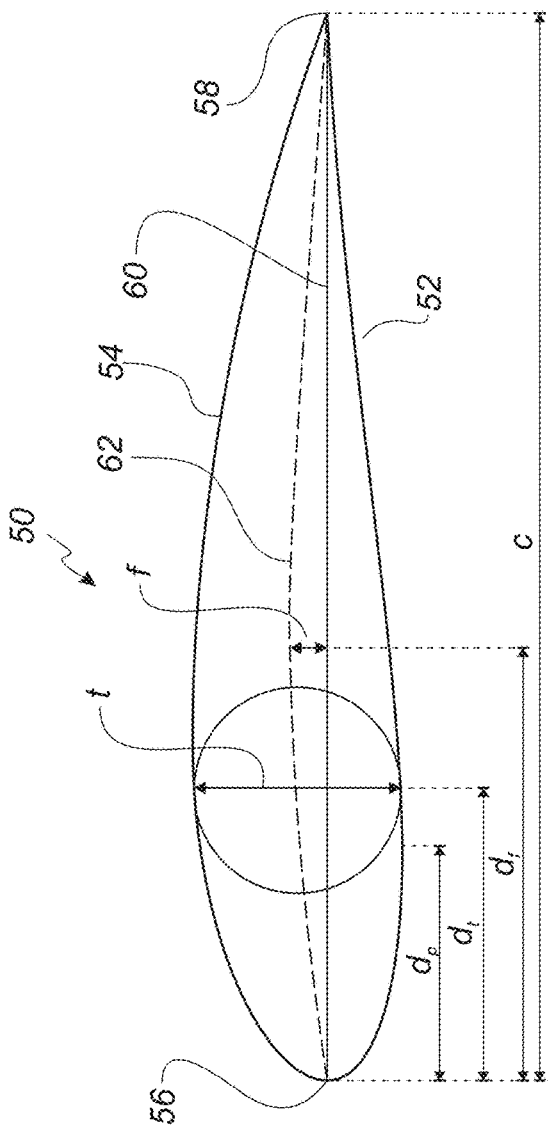

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

Figure 4:
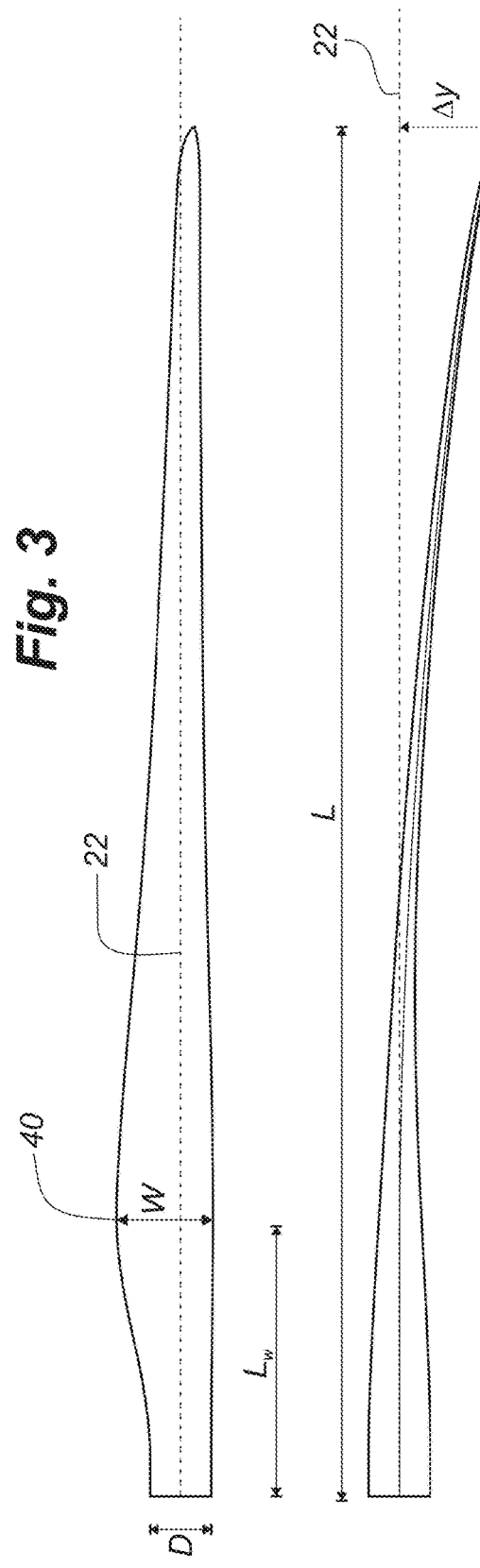
FIG. 4 shows a schematic view of the wind turbine blade of FIG. 2, seen from above and from the side.

FIG. 4 shows some other geometric parameters of the blade. The blade has a total blade length L. As shown in FIG. 2, the root end is located at position r=0, and the tip end located at r=L. The shoulder 40 of the blade is located at a position r=$L_W$, and has a shoulder width W, which equals the chord length at the shoulder 40. The diameter of the root is defined as D. Further, the blade is provided with a prebend, which is defined as Δy, which corresponds to the out of plane deflection from a pitch axis 22 of the blade.

The wind turbine blade 10 generally comprises a shell made of fibre-reinforced polymer, and is typically made as a pressure side or upwind shell part 24 and a suction side or downwind shell part 26 that are glued together along bond lines 28 extending along the trailing edge 20 and the leading edge 18 of the blade 10. Wind turbine blades are generally formed from fibre-reinforced plastics material, e.g. glass fibres and/or carbon fibres which are arranged in a mould and cured with a resin to form a solid structure. Modern wind turbine blades can often be in excess of 30 or 40 meters in length, having blade root diameters of several meters. Wind turbine blades are generally designed for relatively long lifetimes and to withstand considerable structural and dynamic loading.

Figure 5:
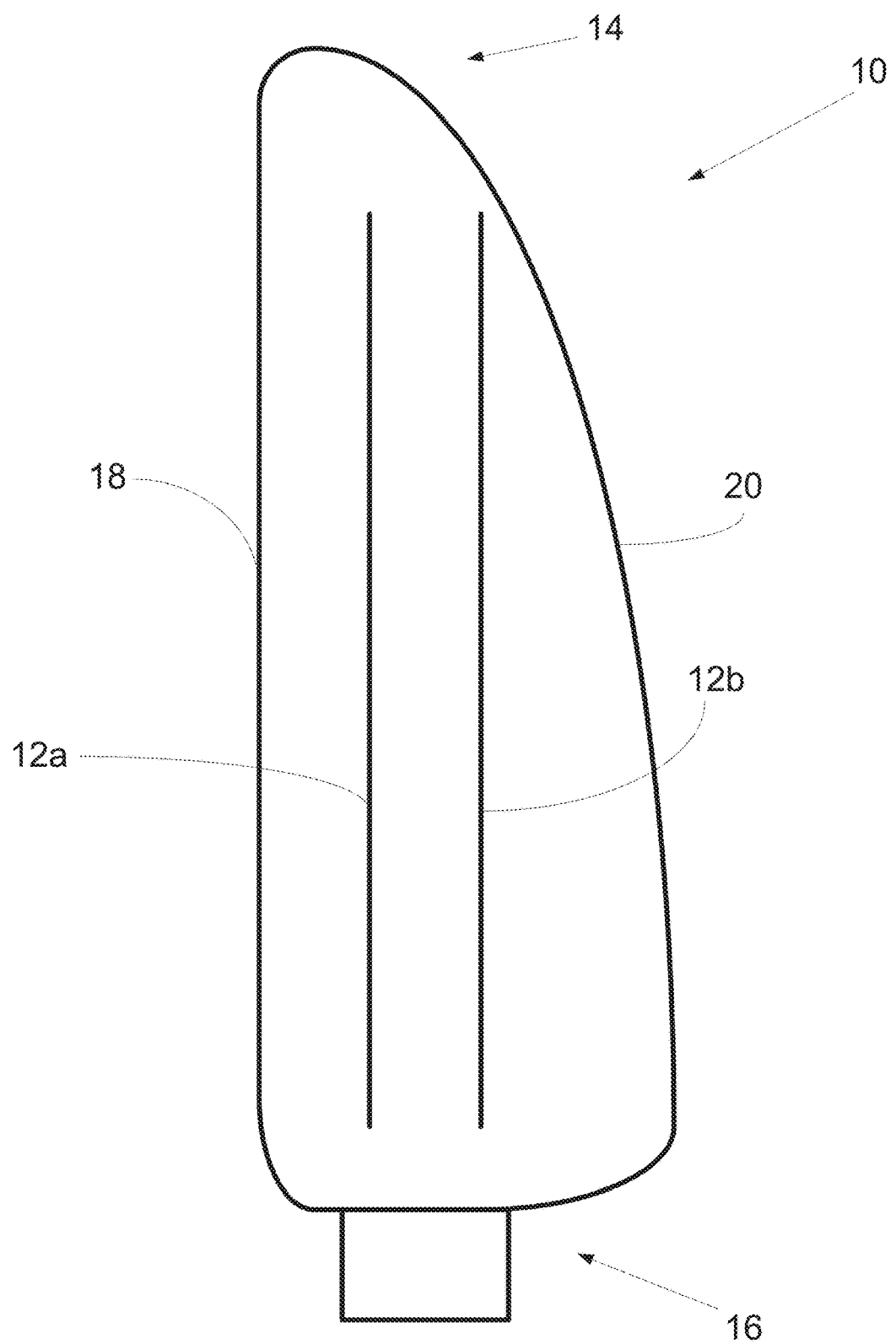
FIG. 5 illustrates a cross-sectional plan view of a known wind turbine blade structure.

A cross-sectional plan view of a wind turbine blade structure is indicated in FIG. 5. The wind turbine blade 10 comprises a pair of substantially parallel internal shear webs 12a, 12b extending along a portion of the longitudinal length of the blade between the internal surfaces of the upwind and downwind shell parts 24,26, a first shear web 12a located towards the leading edge 18 and a second shear web 12b located towards the trailing edge 20. The shear webs 12a, 12b extend from a location adjacent the root end 16 of the blade 10 to a location adjacent the tip end 14 of the blade 10. The shear webs 12a, 12b provide internal reinforcement to the wind turbine blade 10, and prevent buckling of the blade structure. While the embodiment shown in the figures displays a pair of internal shear webs, it will be understood that the invention may also be used in wind turbine blades having alternative internal structures, e.g. spar boxes or beams.

Figure 6:
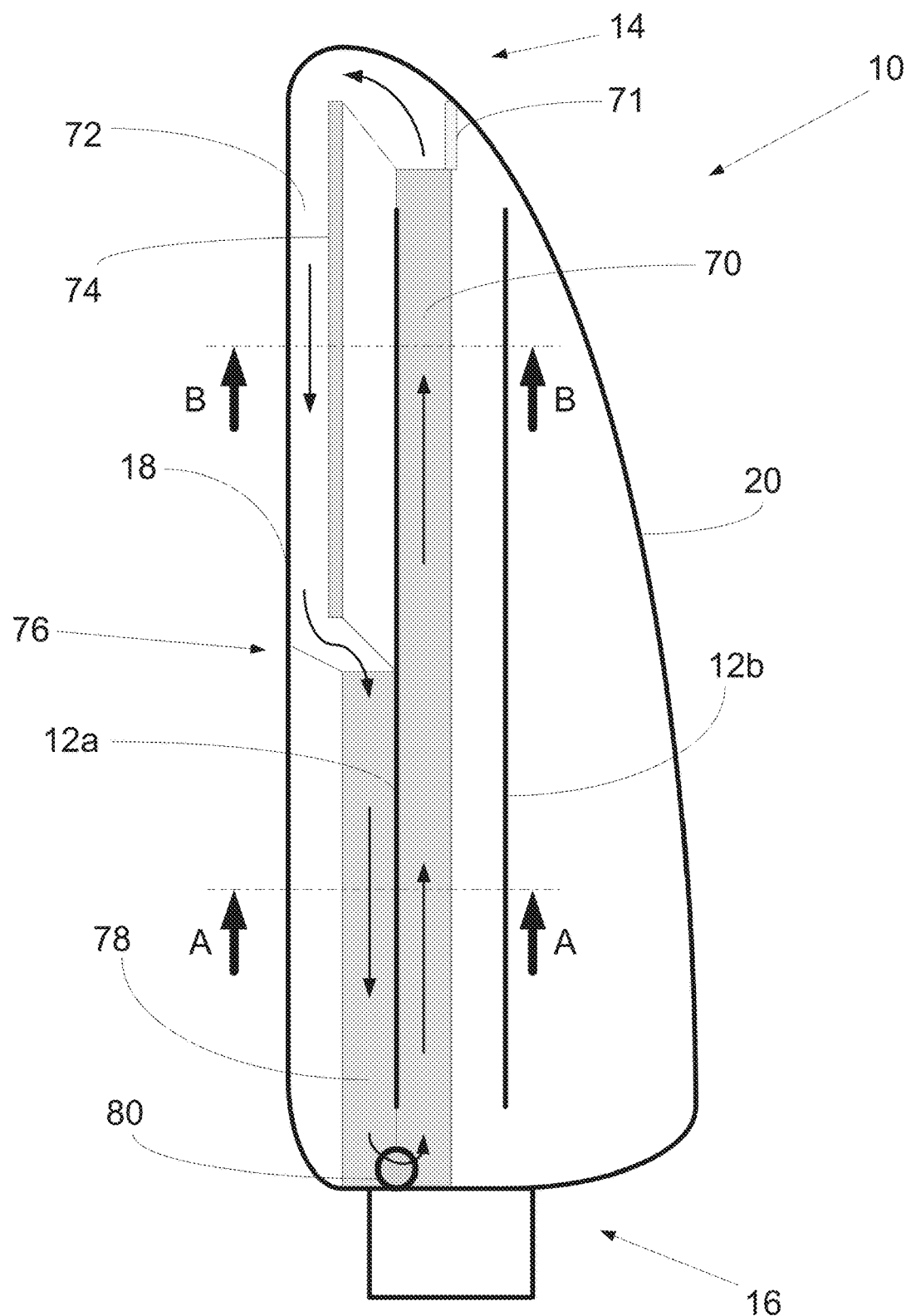
FIG. 6 illustrates a cross-sectional plan view of a wind turbine blade having a de-icing system according to an embodiment of the invention.

A first embodiment of a de-icing system of a wind turbine blade according to the invention is illustrated in FIG. 6, the de-icing system arranged to conduct a heated fluid, e.g. hot air, to raise the temperature of parts of the wind turbine blade 10. The blade 10 comprises an insulated outflow channel 70 in the interior of the blade 10 which extends from a location adjacent the root end 16 of the blade 10 to a location adjacent the tip end 14 of the blade 10. The outflow channel 70 is located between the first and second shear webs 12a, 12b.

At the tip end 14, the outflow channel 70 opens into and is communicatively coupled with a heating channel 72 which is defined along a portion of the leading edge 18 of the blade 10. The heating channel 72 is defined between an insulating wall 74 and the internal surface of the blade 10. Preferably, the heating channel 72 is arranged to heat an area of the surface of the wind turbine blade 10 between approximately 5-15% of the chord length of the blade from the leading edge 18 of the wind turbine blade, further preferably approximately 10% of the chord from the leading edge 18.

The heating channel 72 extends from the tip end 14 of the blade 10 along the leading edge 18 of the blade 10 in the outboard or distal portion of the blade 10, to a heating end point 76 approximately ⅓-⅔ of the length of the blade from the tip end 14 of the blade 10.

It will be understood that the length of the heating channel 72 may be selected dependent on the portion of the leading edge of the blade to which it is desired to provide heating. In the embodiment shown in FIG. 6, the heating channel 72 is shown extending along approximately 50% of the length of the blade 10, but it will be understood that the heating channel may extend along only the outer ⅓ of the blade 10, such that the heating effect is more concentrated in the outer area of the blade 10, where the need to de-ice the blade is more pronounced.

If ice is cleared from some sections of the de-icing region before other sections, an uneven de-icing effect may result, as the de-icing system may experience excessive heat loss from such exposed portions, leading to a reduction in the effectiveness of the de-icing system to remove ice from those sections of the de-icing region still covered by ice. Accordingly, in a preferred aspect, the de-icing is substantially simultaneously performed along the length of the de-icing region, such that ice is removed from the entire surface of the de-icing region at approximately the same time.

At the heating end point 76, the heating channel 72 opens into and is communicatively coupled with an insulated return channel 78. The insulated return channel 78 comprises an insulated conduit which is spaced from the leading edge 18 of the blade 10, and extends from the heating end point 76 to a location adjacent the root end 16 of the blade 10. The insulated return channel 78 is communicatively coupled with the insulated outflow channel 70 adjacent the root end 16 of the blade 10.

A heating and circulation apparatus 80 is provided towards the root end 16 of the blade 10, at or adjacent the interface between the insulated return channel 78 and the insulated outflow channel 70. The apparatus 80 is arranged to heat a circulating fluid as it passes the apparatus 80, and to move the circulating fluid about the de-icing system of the blade 10, through the various channels 70,72,78.

The apparatus 80 may comprise any configuration or combination of suitable systems, e.g. any suitable fluid impellers or fans, and/or any suitable heaters, e.g. heating elements such as electrical heating elements. The fluid impellers or fans may be provided in the same casing as the heating elements, or the systems may be provided as separate units for ease of service and repair operations.

In the embodiment shown in FIG. 6, the heating and circulation apparatus 80 is shown as being provided in the root end 18 of the blade 10. However, it will be understood that the insulated return channel 78 and the insulated outflow channel 70 may extend to the root end 18 of the blade 10. In such embodiments, the insulated return channel 78 and the insulated outflow channel 70 may be communicatively coupled at a location outside of the wind turbine blade 10, and wherein the heating and circulation apparatus 80 may be provided in the hub 8 and/or nacelle 6 of the greater wind turbine structure. Such a configuration may provide for further increased ease of service and repair operations of the de-icing system.

In use, a working fluid, such as atmospheric air, is provided in the de-icing system of the blade 10. The heating apparatus 80 acts to transfer heat to the fluid, which is circulated using an impeller or fan 80. The fluid is transferred from the root end 18 of the blade 10 in the insulated outflow channel 70 to the tip end 14 of the blade 10, as indicated by the arrows. The use of an insulated channel to conduct the fluid from the heating area at the root end 16 of the blade 10 to the tip end 14 of the blade 10 prevents any significant heat loss from occurring from the heated fluid.

At the tip end 14 of the blade 10, the heated fluid enters the heating channel 72. Accordingly, the fluid comes into contact with the internal surface of the leading edge 18 of the blade 10, wherein the heated fluid transfers heat to the leading edge surface of the blade 10. The use of an insulating wall 74 to define the heating channel 72 prevents any significant heat loss in directions away from the leading edge 18 of the blade 10. Accordingly, the external leading surface of the blade 10 is heated to remove any existing ice on the leading edge surface.

In one aspect, as the heated fluid is provided to the leading edge 18 of the blade 10 at the tip end 14 of the blade 10, the initial heating effect is maximised in the tip region of the blade 10 which can provide the most operational benefits for ice removal and/or prevention. Alternatively, it will be understood that the heated fluid may be provided substantially simultaneously to the leading edge 18 of the blade substantially along the length of the region to be de-iced.

The fluid is then circulated to the insulated return channel 78, which is insulated and spaced from the leading edge 18 of the blade 10 to prevent any further heat loss from the system, before the heated fluid reaches the heating and circulating apparatus 80 located at the interface between the return and outflow channels 70,78. Preferably, the system is a closed loop system, wherein the working fluid is recirculated within the channels 70,72,78. It will be understood that the blade 10 may further comprise an injection system to supply additional working fluid into the de-icing system, to compensate for fluid losses due to e.g. leaks, permeability losses, etc.

The outflow channel 70, the insulating wall 74 of the heating channel 72, and/or the return channel 78 are preferably formed from an insulating material, e.g. insulating panels, preferably low density foam panels. For the outflow and return channels 70,78, such panels may be arranged to form a tube or box-like channel structure, which may be attached together using an adhesive bonding, a mechanical connector, and/or by laminating the panel to form said structure. The insulating material may be selected as any suitable material to prevent heat loss, e.g. polystyrene foam (EPS), extruded polystyrene foam (XPS), polyisocyanurate foam, polyurethane foam, composite honeycomb (HSC), balsa wood, etc.

Additionally or alternatively, it will be understood that the outflow channel 70 and/or the return channel 78 may be at least partially defined by the shear webs 12a, 12b of the blade 10, e.g. wherein at least one of the shear webs 12a, 12b acts to define at least one side of the outflow channel 70 and/or the return channel 78, wherein the other sides of the outflow channel 70 and/or the return channel 78 may be defined by an insulating material attached to the said at least one shear web 12a, 12b.

Additionally or alternatively, the insulated outflow channel 70, the insulating wall 74, and/or said insulated return channel may be formed from a flexible insulated material. In one aspect, said outflow channel 70 and/or said return channel 78 may be formed as a double-walled inflatable tube (not shown), the tube comprising an inner tube and an outer tube, said inner tube located within the interior of said outer tube. The inner tube may be arranged to convey a heated working fluid, wherein the outer tube defines an insulating cavity around the inner tube. The insulating cavity may be provided with an insulating fluid, to prevent heat loss from any heated fluid conveyed in the inner tube. Preferably, said insulating fluid comprises an inert gas, e.g. argon, but it will be understood that atmospheric air may be used as the insulating fluid. In one aspect, the insulating fluid may comprise a mixture of an inert gas and air.

Providing an insulating channel as a flexible material using a lightweight fluid as an insulator, the additional weight that the de-icing system introduces to the wind turbine blade 10 is minimised, and the extra stresses and strains that the de-icing system bears on the wind turbine blade structure is also minimised, when compared to a prior art rigid structure of de-icing system.

Preferably, said inner tube and/or said outer tube are formed from a substantially impermeable flexible material, e.g. rubber, latex, polychloroprene, nylon fabric, tarpaulin, plastic sheeting, cellulose acetate, polyester fabric, polyethylene, polypropylene, polytetrafluoro ethylene, polyvinyl chloride, vinylchloride acetate, preferably a waterproof material, or a material treated to improve the impermeability of the material, e.g. by applying a coating, for example a PVC coating.

By providing insulating channels made from flexible material, this allows that the channels can be inflated for use from a collapsed or compressed state. As a result, the components of the de-icing system can be relatively easily manufactured without requiring high degrees of accuracy for assembly or positioning. In addition, due to the inflatable nature of the channels, the components can be easily transported in an un-inflated state from a manufacturing location to a location for installation in a wind turbine blade, where the channels can be inflated during or after installation in the blade. It will be understood that the inflation of the insulated channels may be performed at the time of manufacture and assembly of the wind turbine blade having such a de-icing system, the channels then sealed to retain the insulating fluid. Additionally or alternatively, the inflation of the channels may be performed when a de-icing operation is executed, or is predicted to occur.

By only inflating the channels for periods where the de-icing system is active or is expected to be active, accordingly the efficiency of the de-icing system and the general operation of the wind turbine blade can be improved. In one aspect, the de-icing system may experience reduced losses of insulating fluid from the system as opposed to a system wherein the insulating fluid is retained in the channels for the lifetime of the wind turbine blade. In a further aspect, any structural effects on the wind turbine blade which may result from the inflation of the channels can be confined to the occurrence of de-icing events, and have no impact on the performance of the wind turbine blade outside of such de-icing events. Such inflatable tubing may be attached to or suspended from the structure of the blade 10 at separate anchor points along the length of the blade 10, thereby reducing the size and/or number of bonding or attachment locations which require attention during assembly of the wind turbine blade 10.

Figure 7:
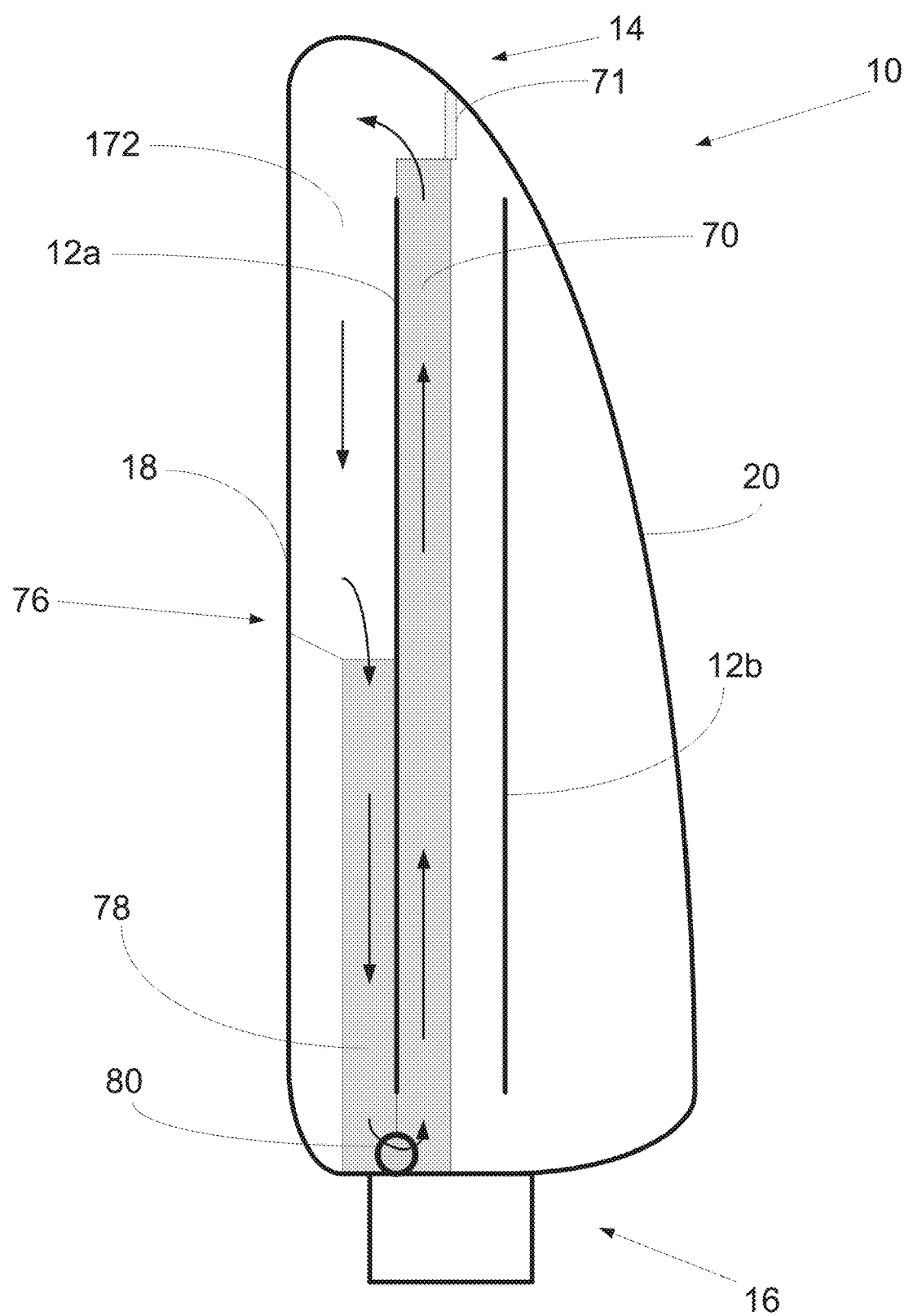
FIG. 7 illustrates a cross-sectional plan view of a wind turbine blade having a de-icing system according to a further embodiment of the invention.
Figure 8:
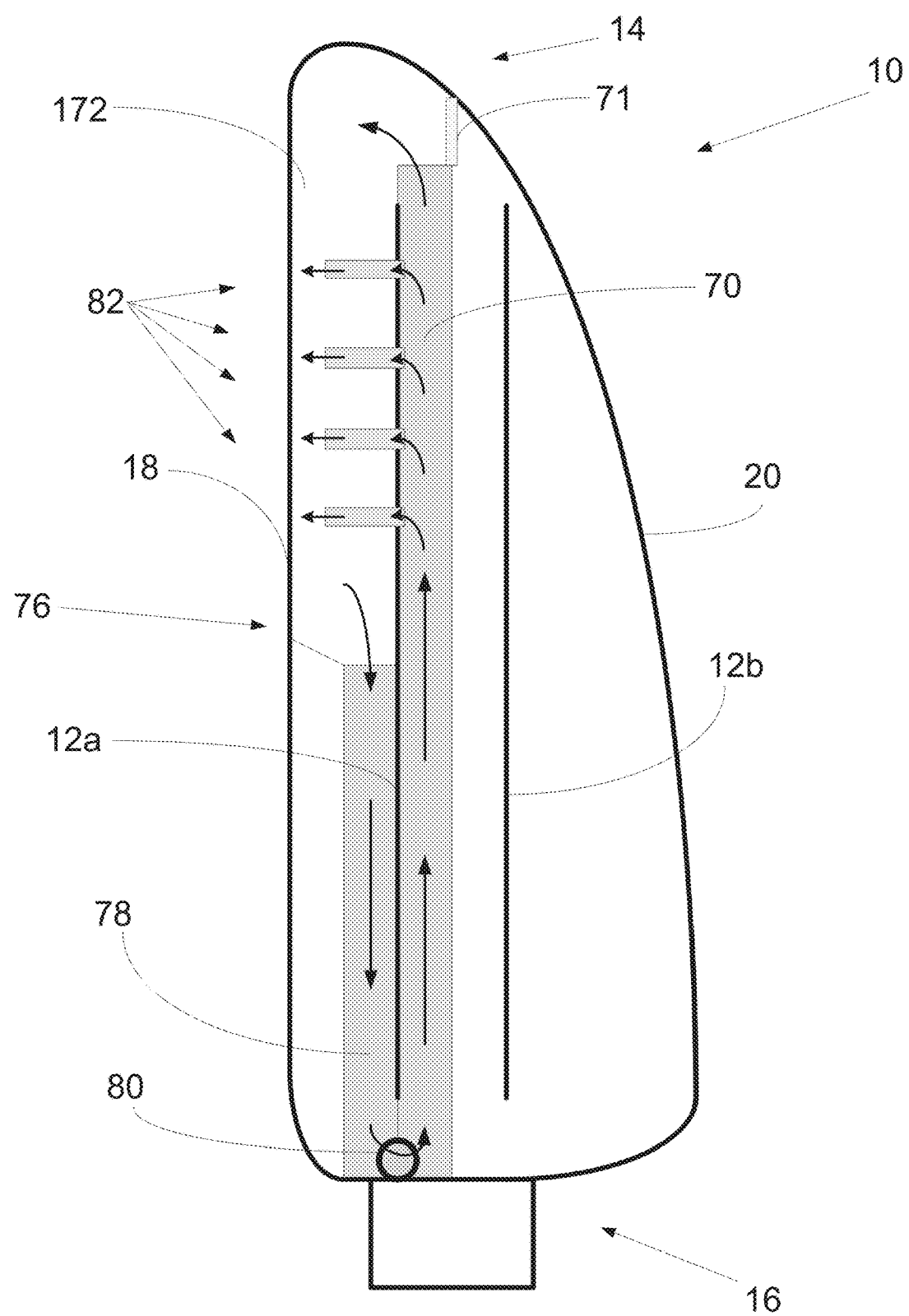
FIG. 8 illustrates a cross-sectional plan view of a wind turbine blade having a de-icing system according to a further embodiment of the invention.

It will be understood that alternative configurations of the de-icing system according to the invention may be employed. FIGS. 7 and 8 illustrate alternative embodiments of the invention, where it will be understood that elements common from the embodiment of FIG. 6 have been provided with the same reference numerals in the embodiments of FIGS. 7 and 8. Accordingly, the description in respect of FIG. 6 above may be applied to the embodiments of FIGS. 7 and 8.

In FIG. 7, the insulated outflow channel 70 is communicatively coupled with and opens into a heating cavity 172 at the tip end 14 of the blade 10. The heating cavity 172 is defined between the surface of the leading-edge-side shear web 12a and the internal surface of the wind turbine blade 10 at the leading edge of the blade 10. In this embodiment, the shear web 12a may be provided with an insulating material, e.g. as a coating layer provided on the surface of the leading-edge-side of the shear web 12a. The heating cavity 172 extends from the tip end 14 of the blade 10 along the leading edge 18 of the blade 10 in the outboard or distal portion of the blade 10, to a heating end point 76 approximately ⅓-⅔ of the length of the blade from the tip end 14 of the blade 10.

At the heating end point 76, the heating cavity 172 opens into and is communicatively coupled with the insulated return channel 78, which is communicatively coupled with the insulated outflow channel 70 adjacent the root end 16 of the blade 10, the heating and circulation apparatus 80 arranged to heat and circulate a working fluid through the de-icing system. The embodiment of FIG. 7 results in the removal of the insulating wall 74 compared to the embodiment of FIG. 6, resulting in less parts and assembly than required for the embodiment of FIG. 7.

In FIG. 8, a plurality of diverter tubes 82 are provided in the blade 10, the tubes 82 extending from and providing a connection between the outflow channel 70 and the heating cavity 172. The tubes 82 are spaced along the length of the heating cavity 172, wherein a portion of heated fluid in the outflow channel 70 can be redirected from the outflow channel 70 into the heating cavity 172. The tubes 82 are arranged such that the heated fluid is directed to a location closely adjacent the internal surface of the wind turbine blade 10 at the leading edge 18 of the blade 10, such that the heating effect of the fluid is maximised for the leading edge 18 along the length of the heating cavity 172, due to the heated fluid being conveyed immediately to the actual leading edge surface of the cavity 172.

The tubes 82 are arranged in apertures provided in the leading-edge-side shear web 12a, but it will be understood that the tubes 82 may be removed entirely, and the outflow channel 70 and heating cavity 172 connected by apertures in the shear web 12a. The apertures may be formed by drilling or machining of portions of the shear web 12a. It will be understood that reinforcements may be applied about the apertures, to preserve the structural integrity of the shear webs 12a, e.g. additional strengthening material may be applied to the shear web 12a around the periphery of the apertures. The reinforcement may comprise additional layers of laminate material, additional balsa, etc. The edges of the apertures may comprise chamfered, tapered or rounded edges, to reduce or eliminate any possible negative fluid dynamic effects due to the presence of sharp corners in the apertures. It will be understood that additional baffles or fluid direction elements may be used in combination with the apertures to re-direct a portion of the fluid flow in the outflow channel 70 to the heating cavity 172.

Additionally or alternatively, the embodiment of FIG. 6 may further comprise a plurality of tubes which extend from the outflow channel 70 through the shear web 12a and the insulating wall 74 to redirect heated fluid into the heating channel 72

The tubes 82 may be provided with actuatable valves (not shown) which can be controlled to regulate the flow of heated fluid from the outflow channel 70 to the leading edge 18 of the blade 10. The valves may be remotely controlled, and/or may be temperature-controlled valves, which are arranged to open when the area adjacent the valve exceeds a pre-defined temperature. In particular, the valves may be controlled such that the tubes 82 are opened in sequence from the tip end 14 towards the root end 16. In this case, the heating of the leading edge 18 of the blade 10 can be accurately controlled and regulated. Accordingly, the valves may be arranged to improve the efficiency and general performance of the de-icing system of the blade 10. Additionally or alternatively, the tubes or apertures may be arranged in a pattern to ensure a relatively uniform de-icing of the blade surface, e.g. as a plurality of staggered rows of tubes or apertures.

It will be understood that suitable baffles may be used to seal off sections of the blade 10 from the channels or cavities 70,72,78,172 of the de-icing system, to prevent the heated fluid from entering said sections, e.g. a baffle 71 to prevent the heated fluid from entering the area between the trailing-edge-side shear web 12b and the trailing edge 20 of the blade 10.

Figure 9:
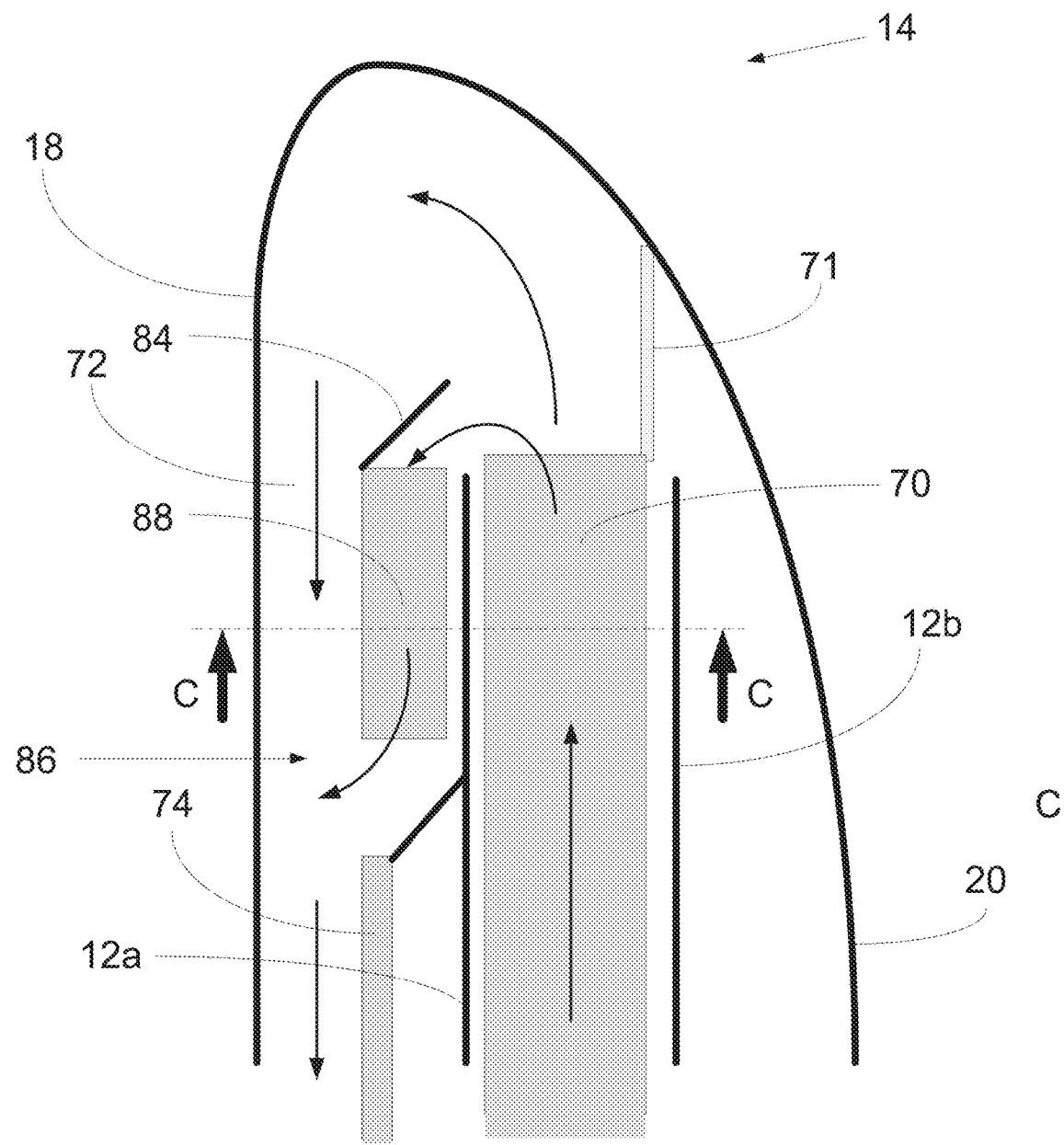
FIG. 9 illustrates an enlarged cross-sectional view of a tip end section of a wind turbine blade having a de-icing system according to an aspect of the invention.

The tip end 14 of the wind turbine blade 10 may be configured to improve the effectiveness of the de-icing system of the blade 10. With reference to the enlarged view of FIG. 9, a first embodiment of an enhanced tip portion of a blade 10 is shown for the embodiment of FIG. 6. In FIG. 9, the outflow channel 70 is connected to the heating channel 72 as defined by the insulating wall 74, wherein heated fluid provided in the outflow channel 70 can flow to the leading edge 18 of the wind turbine blade 10. In addition, a supplemental baffle member 84 is located adjacent the end of the outflow channel 70, wherein the baffle 84 acts to divert a portion of the flow of heated fluid from the outflow channel to a secondary location 86 within the heating channel 72. As the baffle 84 is arranged to divert some of the heated fluid to a location 86 in the heated channel 72 spaced from the tip end 14 of the blade 10, accordingly two separate locations within the tip region of the blade 10 receive heated fluid directly from the insulated outflow channel 70, where the heated fluid has the highest heat content. As a result, the maximum heating effect of the heated fluid can be initially brought to bear on a wider area of the leading edge 18 of the blade 10.

In this embodiment of FIG. 9, the baffle 84 is coupled to a supplemental insulated flow channel 88 in the heating channel 72, such that the flow of heated fluid which is redirected by the baffle 84 is prevented from significant heat loss before reaching the secondary location 86. It will be understood that the wind turbine blade 10 may comprise a plurality of baffles and/or supplemental flow channels to provide for appropriate redirection of heated fluid to desired locations within the heating channel 72 or heating cavity 172 of the blade de-icing system.

It will be understood that in normal blade constructions, blade shear webs or other internal constructions do not extend completely to the tip end 14 of the blade 10, due to height restrictions in the internal blade cavity. In the case of embodiments wherein the outflow channel 70 is connected to a leading edge heating channel or cavity via tubes or apertures provided in the shear web 12a, this requires additional considerations in the design of the tip portion of the de-icing system. In some aspects, the outflow channel 70 can open directly to the leading edge 18 at the tip end 14, with a baffle 71 or other sealing device acting to prevent heated fluid from the outflow channel 70 leaving the closed loop of the de-icing system and entering the cavity between the trailing-edge-side shear web 12b and the blade trailing edge 20, as can be seen in FIG. 8.

Figure 10:
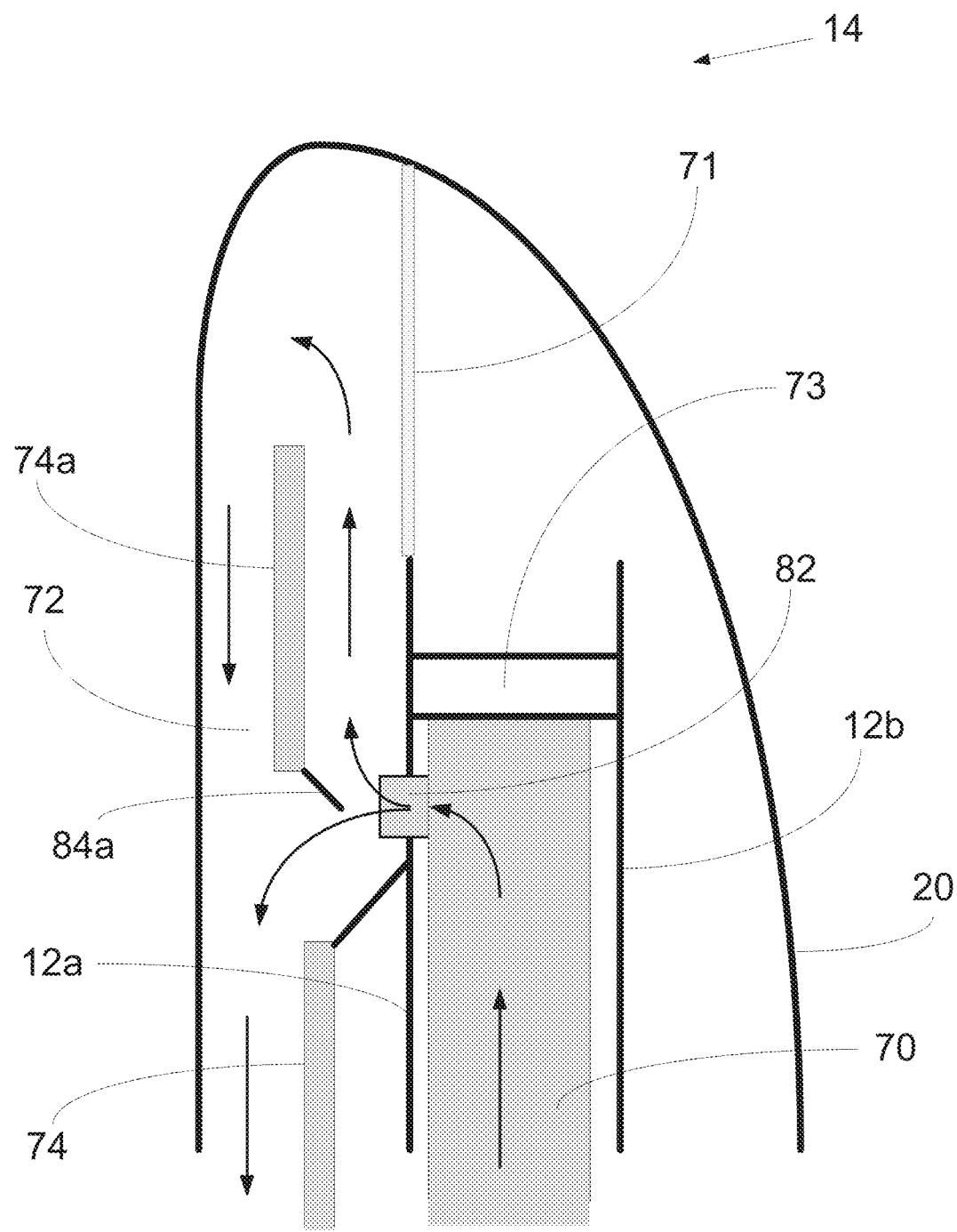
FIG. 10 illustrates an enlarged cross-sectional view of a tip end section of a wind turbine blade having a de-icing system according to a further aspect of the invention.

With reference to the enlarged view of FIG. 10, an alternative configuration of an enhanced tip portion of a blade 10 is shown. The outflow channel 70 is sealed at the tip end of the channel 70. In FIG. 10 this is illustrated by a separate sealing element 73 provided at the end of the outflow channel 70, but it will be understood that the outflow channel 70 may be provided as a sealed tube or box structure having a closed end arranged towards the tip end 14 of the blade 10.

A tube 82 or aperture is arranged to provide a flow passage between the outflow channel 70 and the leading edge heating channel or cavity 72, the tube 82 or aperture extending through the shear web 12a. A baffle 71 or other sealing device is arranged at the end of the leading-edge-side shear web 12a to prevent fluid flow from the leading edge heating channel or cavity 72 around the tip end of the shear web 12a.

As the tube 82 or aperture is located spaced from the tip end 14 of the blade 10, accordingly a supplementary baffle 84a is arranged to re-direct a portion of the heated fluid from the tube 82 or aperture towards the tip end 14 of the blade 10. The supplementary baffle 84a may be coupled with a supplementary insulating wall 74a to prevent additional heat loss before the redirected fluid reaches the tip end 14 of the blade 10. At the tip end 14, the redirected fluid flows along the leading edge 18 in the direction of the root end 20 before re-joining the remainder of the heated fluid from the outflow channel 70 which is not re-directed by the supplementary battle 84a. Accordingly two separate locations within the tip region of the blade 10 receive heated fluid directly from the insulated outflow channel 70, where the heated fluid has the highest heat content. As a result, the maximum heating effect of the heated fluid can be initially brought to bear on a wider area of the leading edge 18 of the blade 10.

Figure 11:
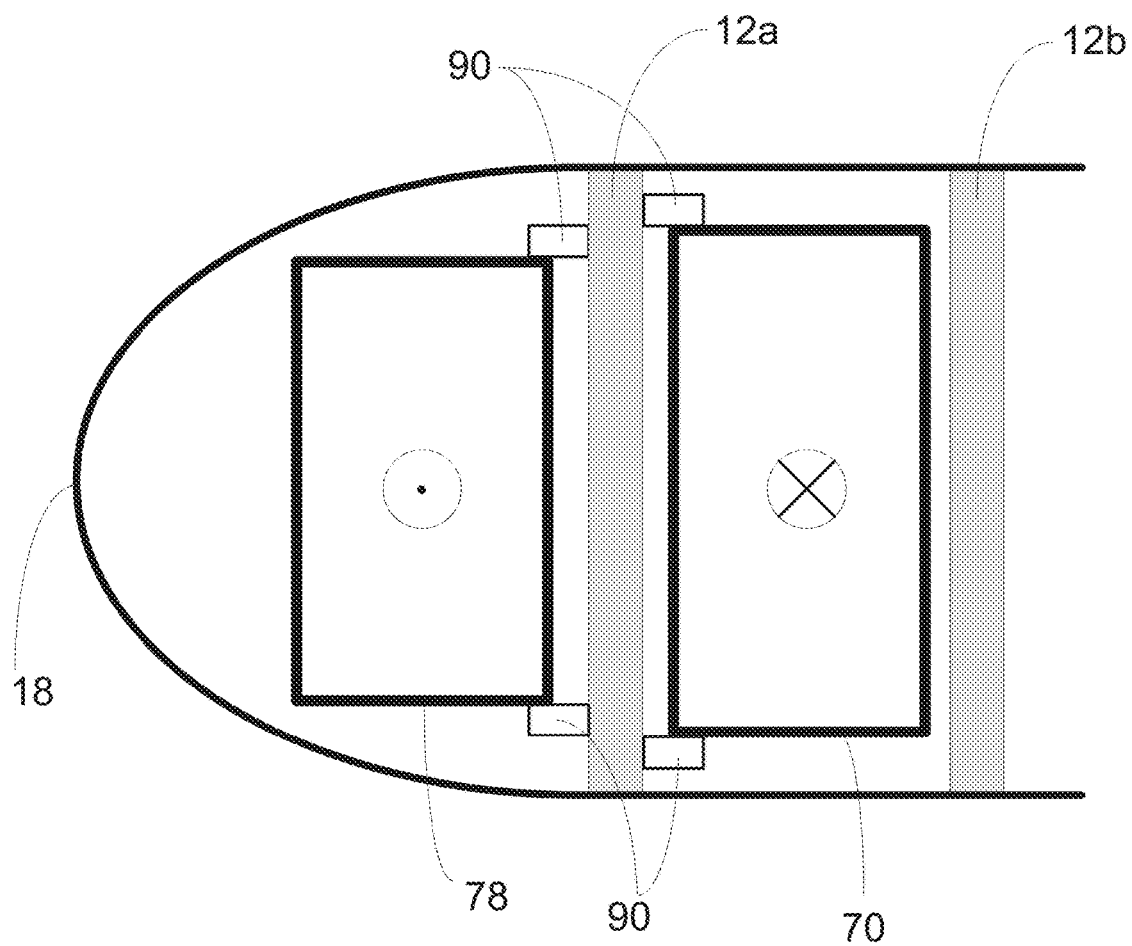
FIG. 11 illustrates a cross-sectional view of a section of the wind turbine blade of FIG. 6 along line A-A.

With reference to FIG. 11, a cross-sectional view along line A-A of FIG. 6 is shown, wherein the flow directions of the outflow and return channels 70,78 are indicated. As can be seen in FIG. 11, the outflow channel 70 and the return channel 78 are each supported on the leading-edge-side shear web 12a by the use of flexible bracket pieces 90. The bracket pieces 90 may be provided as an upper and lower rail extending along a length of the shear web 12a, and/or the bracket pieces 90 may be provided as an array of separate bracket elements arranged along the length of the shear web 12a. The bracket pieces 90 may be formed from a suitable resilient material, e.g. rubber, which can deform to accommodate localised bending or other stresses and strains experienced between the channels 70,78 and the shear web 12a.

By supporting the channels 70,78 of the de-icing system on the shear web 12a, accordingly any structural effects of the inclusion of the de-icing system in the wind turbine blade 10 can be minimised, and effectively confined to the existing structural elements of the blade 10. Accordingly, any effects on the aerodynamic shell portions of the blade can be minimised or eliminated entirely, due to the isolation of the channels 70,78 from the surfaces of the blade shells. While the illustrated embodiments show the elements of the de-icing system supported on a shear web, it will be understood that the elements may be alternatively supported on other types of blade structural members, e.g. spar boxes, etc.

It will be understood that while the channels 70,78 are shown in FIG. 11 supported on the leading-edge-side shear web 12a, other configurations may be used. For example, the outflow channel 70 may be fully or partly supported on the trailing-edge-side shear web 12b using suitable bracket pieces (not shown), thereby distributing the forces involved in the mounting of the de-icing system between the two shear webs 12a, 12b.

While the outflow channel of the above embodiments is shown as an insulated channel extending substantially the entire length of the blade from the root end to the tip end, it will be understood that other configurations of outflow channel may be used. In one alternative, the outflow channel may comprise an insulated channel extending a part of the way from the root end of a blade to a location towards the tip end, and wherein the outflow channel from said location along the length of the blade to the tip end of the blade is at least partly formed by blade structural components, e.g. blade shear webs, blade shell elements, a spar box, etc. Preferably, at least a portion of said blade structural components are treated with an insulating material to reduce heat loss from the system. At said location towards the tip end, it will be understood that suitable internal bulkheads, sealing members or flow stoppers may be used to prevent the loss of fluid from the outflow channel.

In one aspect, the outflow channel comprises an insulated channel extending along approximately ⅔ of the length of the blade from the root end, wherein for the approximate outer ⅓ of the blade length, the outflow channel is formed by the space defined by the internal shear webs of the blade and sections of the blade shell.

With reference to FIG. 12, a pair of alternative cross-sectional views along line B-B of FIG. 6 is shown, wherein the flow directions of the outflow and heating channels 70,72 are indicated.

Figure 12A:
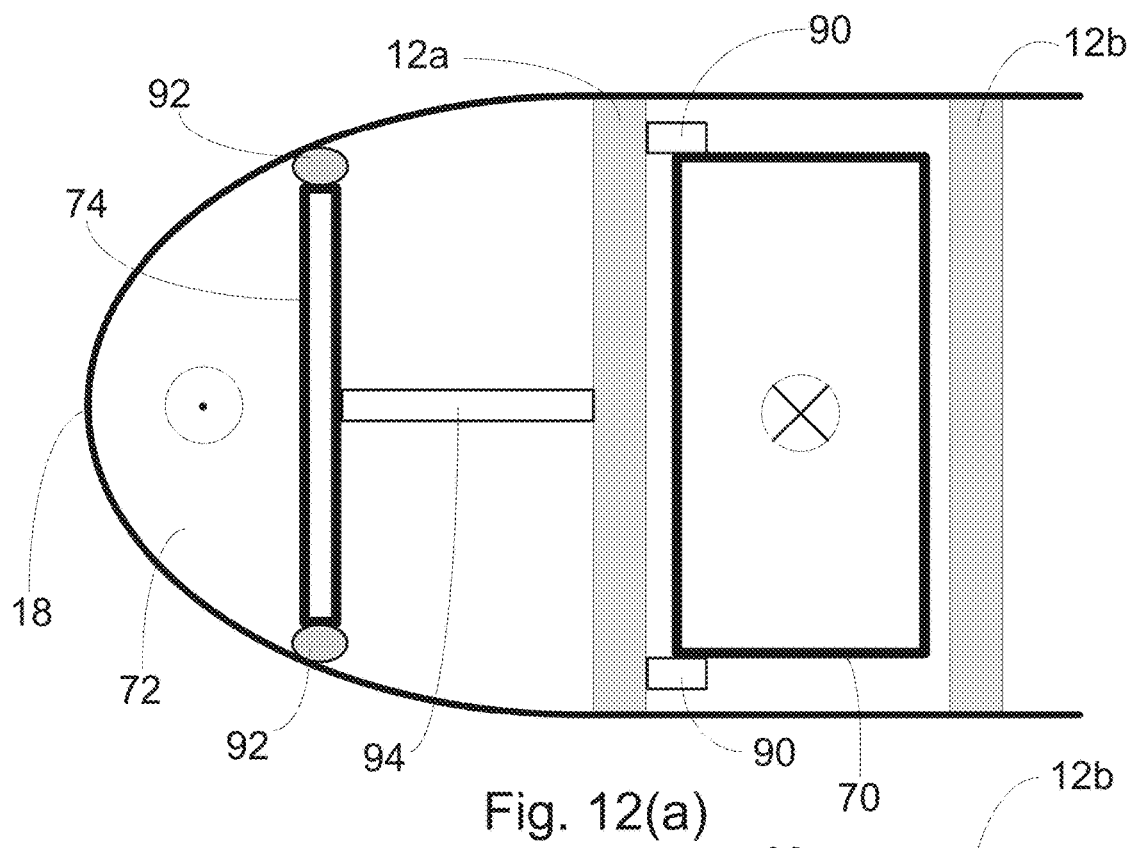
FIG. 12 illustrates two cross-sectional views of alternative configurations of a section of the wind turbine blade of FIG. 6 along line B-B.

In FIG. 12(a), a first embodiment of a support mechanism for the insulating wall 74 of the embodiment of FIG. 6 is shown. The insulating wall 74 is supported from the leading-edge-side shear web 12a via at least one intermediate bracket 94 extending from the shear web 12a. The at least one intermediate bracket 94 may be provided as continuously extending rail or truss structure extending from the surface of the shear web 12a, and/or the at least one intermediate bracket 94 may be provided as an array of separate bracket elements arranged along the length of the shear web 12a. The insulating wall 74 is provided with upper and lower sealing members 92 arranged between the upper and lower ends of the insulating wall 74 and the internal surface of the wind turbine blade 10. The sealing members 92 are arranged to prevent the exit of heated fluid from the heating channel 72. The sealing members 92 are provided as non-load-carrying members. The sealing members 92 are formed from a suitable flexible material, such that the sealing members 92 deform in response to relative movement between the insulating wall 74 and the blade shell, wherein the blade shell is isolated from any stresses or strains which may result from the operation of the wind turbine blade 10.

Figure 12B:
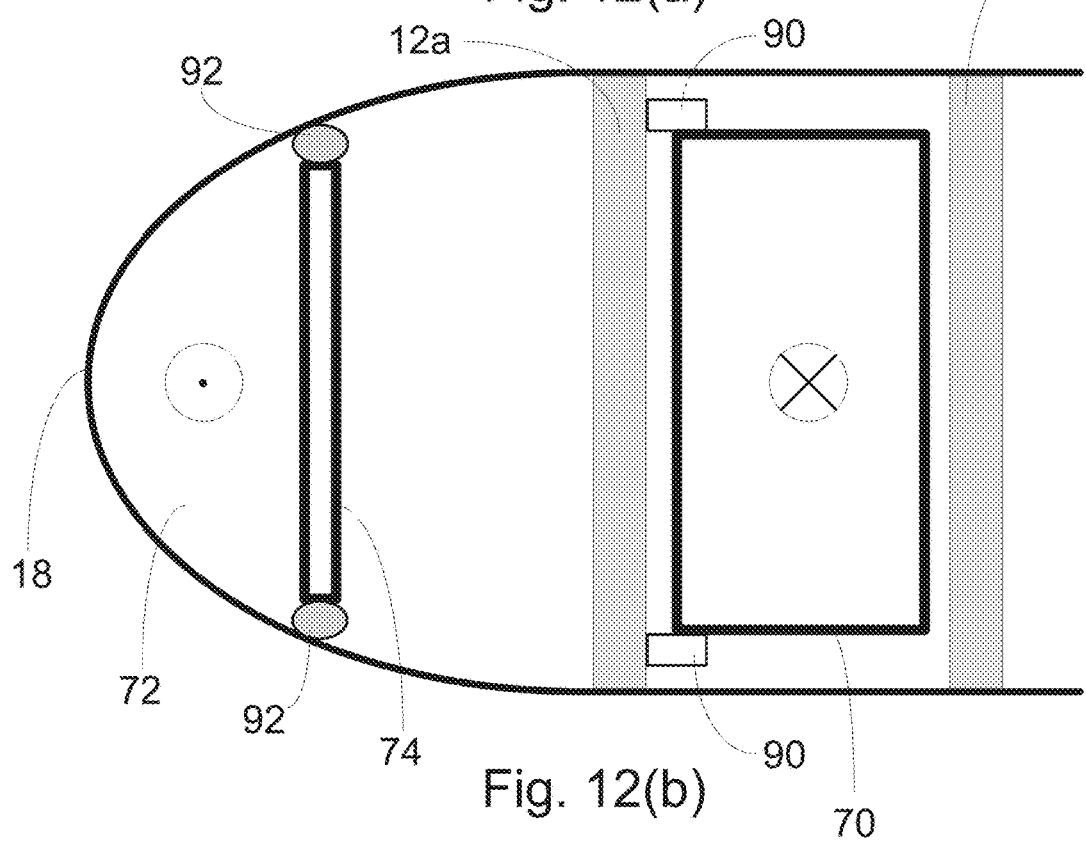

In the embodiment of FIG. 12(b), the insulating wall 74 is supported without the use of the at least one intermediate bracket 94, wherein the sealing members 94 are arranged to hold the insulating wall 74 in position to define the heating channel 72. In this embodiment, the sealing members 92 are operable to deform to allow for a degree of relative movement between the insulating wall 74 and the blade shell, to minimise the stresses and strains transferred from the insulating wall 74 to the blade shell during operation of the wind turbine blade 10.

Figure 13:
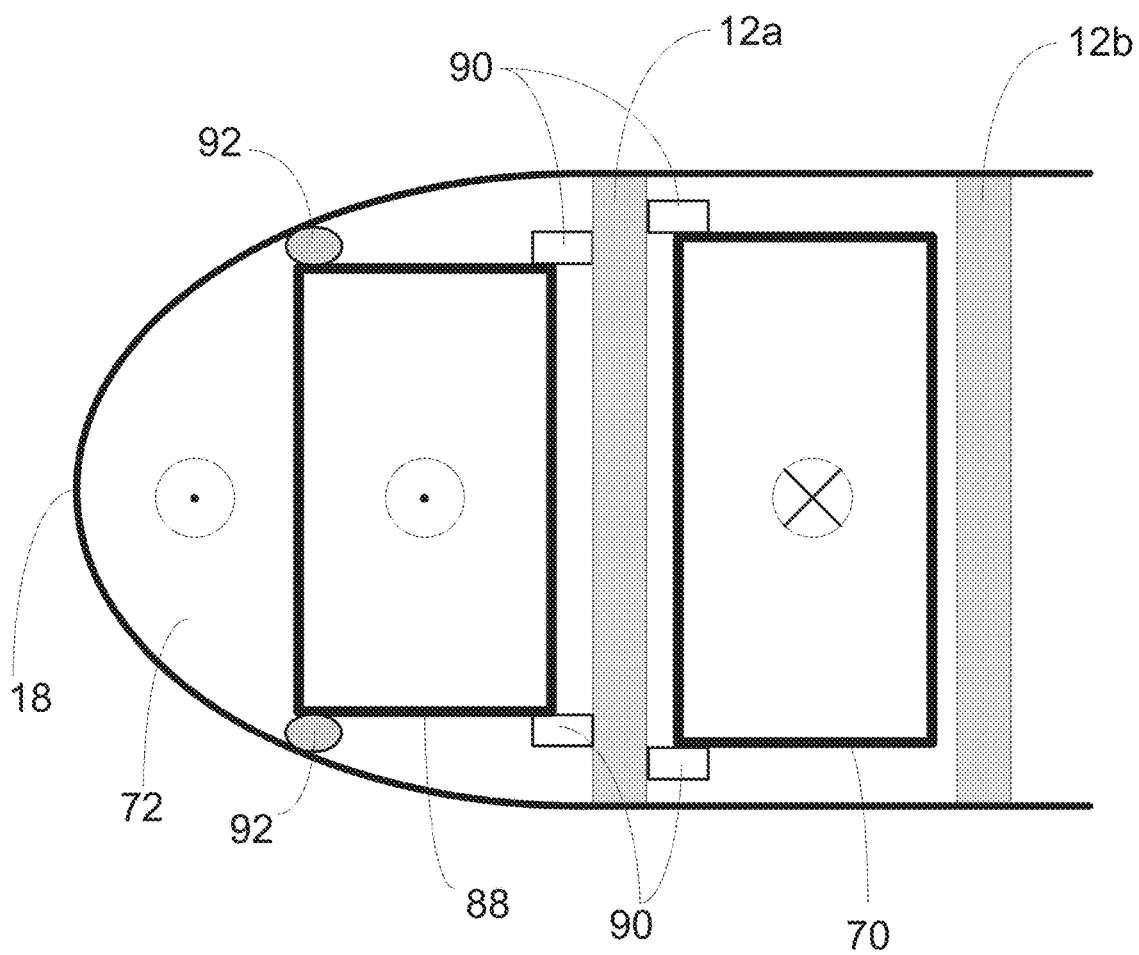
FIG. 13 illustrates a cross-sectional view of a section of the wind turbine blade of FIG. 9 along line C-C.

FIG. 13 illustrates a cross-sectional view along line C-C of FIG. 9. In FIG. 13, similar to FIG. 11, the supplemental insulated flow channel 88 is supported on the leading-edge-side shear web 12a using bracket pieces 90, and wherein the leading-edge-side of the supplemental insulated flow channel 88 is connected to the internal surfaces of the blade shell using upper and lower sealing members 92, to define a portion of the heating channel 72 between the supplemental insulated flow channel 88 and the leading edge 18 of the wind turbine blade 10.

A further sample configuration is illustrated in FIGS. 14(a) and 14(b), wherein an insulating wall 96 is provided as a curved member which can be mounted to the leading-edge-side shear web 12a. The curved insulating wall 96 can be shaped to correspond with the internal surface of the leading edge of the wind turbine blade, wherein the leading edge heating channel 72 is provided as a chamber shaped to follow the leading edge profile of the wind turbine blade.

Figure 14:
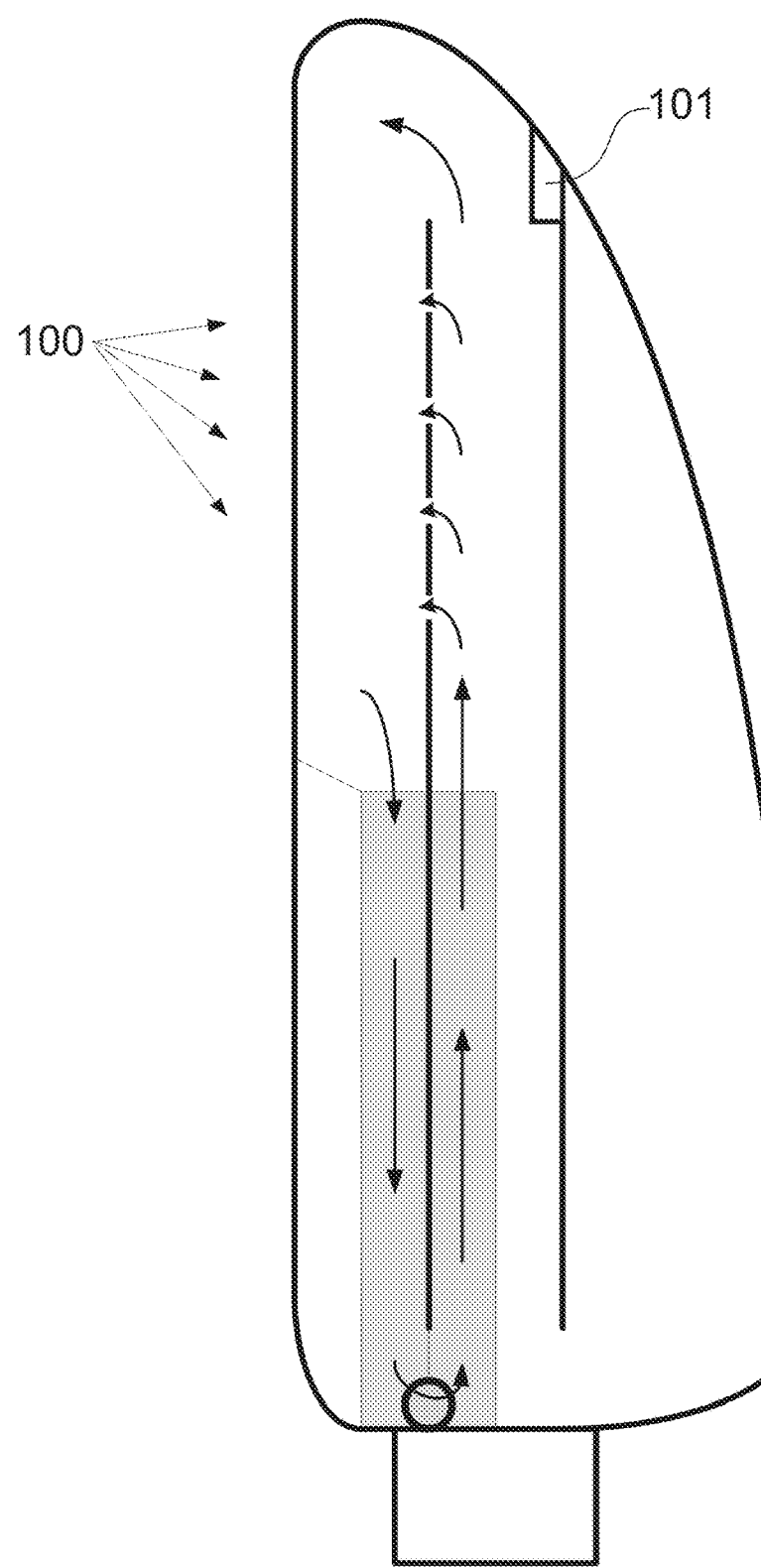
FIG. 14 illustrates a cross-sectional plan view of a wind turbine blade having a de-icing system according to a further embodiment of the invention.

FIG. 14 illustrates a blade with a de-icing system having an insulated outflow channel utilizing the space between two shear webs as part of the channel. The shear web closest to the leading edge has a plurality of apertures (100). The heated fluid enters the heating channel partly through these apertures, partly by flowing toward the tip end and entering the heating channel where the shear web ends.

It is clear that baffles (101) may be used to restrict flow of heated fluid in unwanted directions. The opening of the outflow channel towards the tip end may also be isolated from the root end by a baffle (not shown) between the shear webs to avoid any backflow of fluid towards the root end, whereby energy intended for heating the leading edge may be lost.

Figure 15:
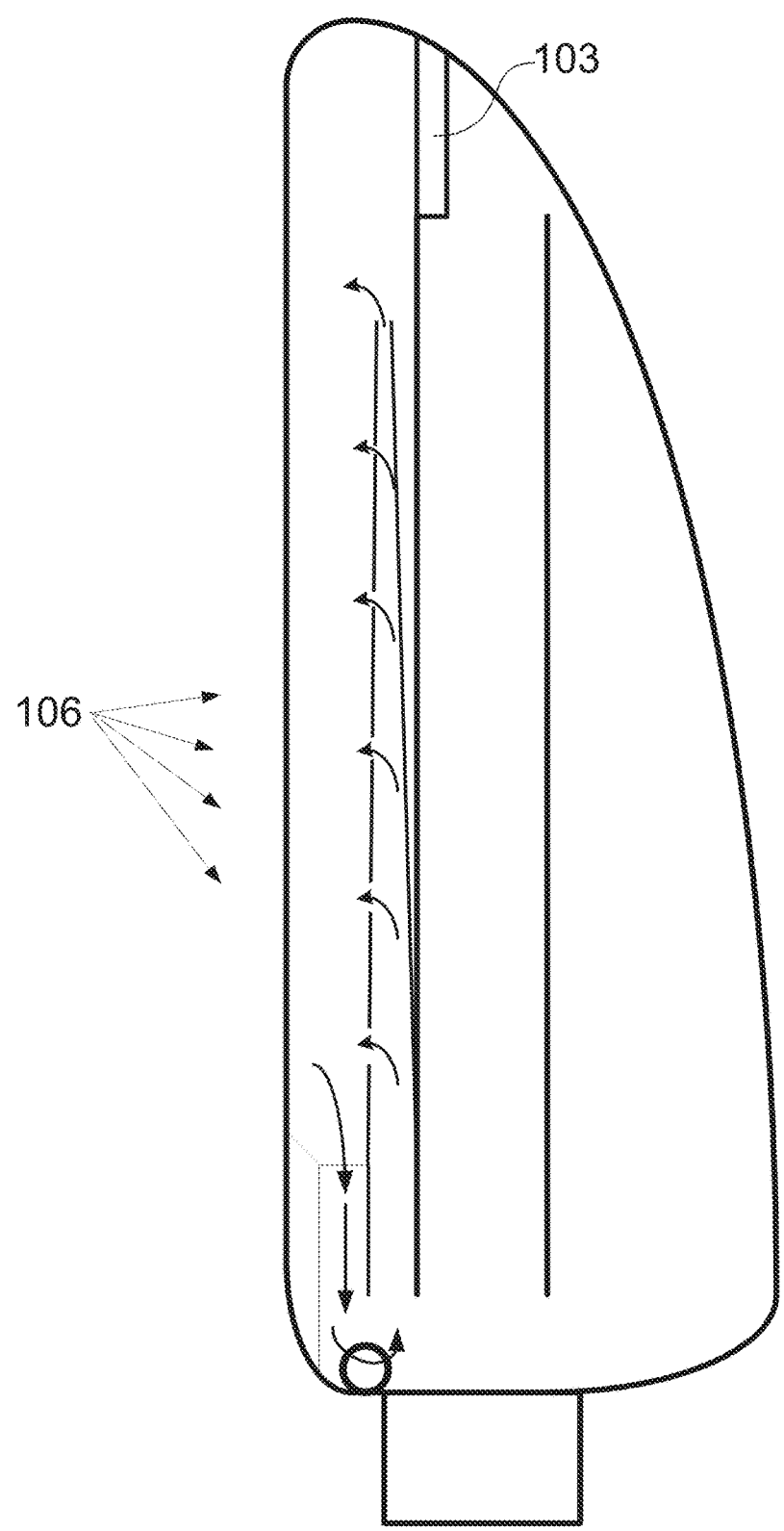
FIG. 15 illustrates a cross-sectional plan view of a wind turbine blade having a de-icing system according to a further embodiment of the invention.

FIG. 15 illustrates an outflow channel decreasing in cross sectional area from the root end towards the tip end. The outflow channel has a plurality of apertures (106) and is, mounted on a shear web and facing the leading edge of the blade. The narrowing outflow channel may typically extend to close to the tip of the blade, but may also be shorter, depending on the particular blade and the de-icing system as a whole.

The apertures may have different cross sectional areas. For example the size of the apertures may diminish as the outflow channel becomes narrower. The exact geometry of the apertures may be optimized for effectiveness in providing heating in the heating channel, before entering the return channel.

Baffle (103) again indicates that flow of heated fluid towards areas of the blade not benefitting from any heating may be restricted by one or more baffles installed within the blade.

Figure 16:
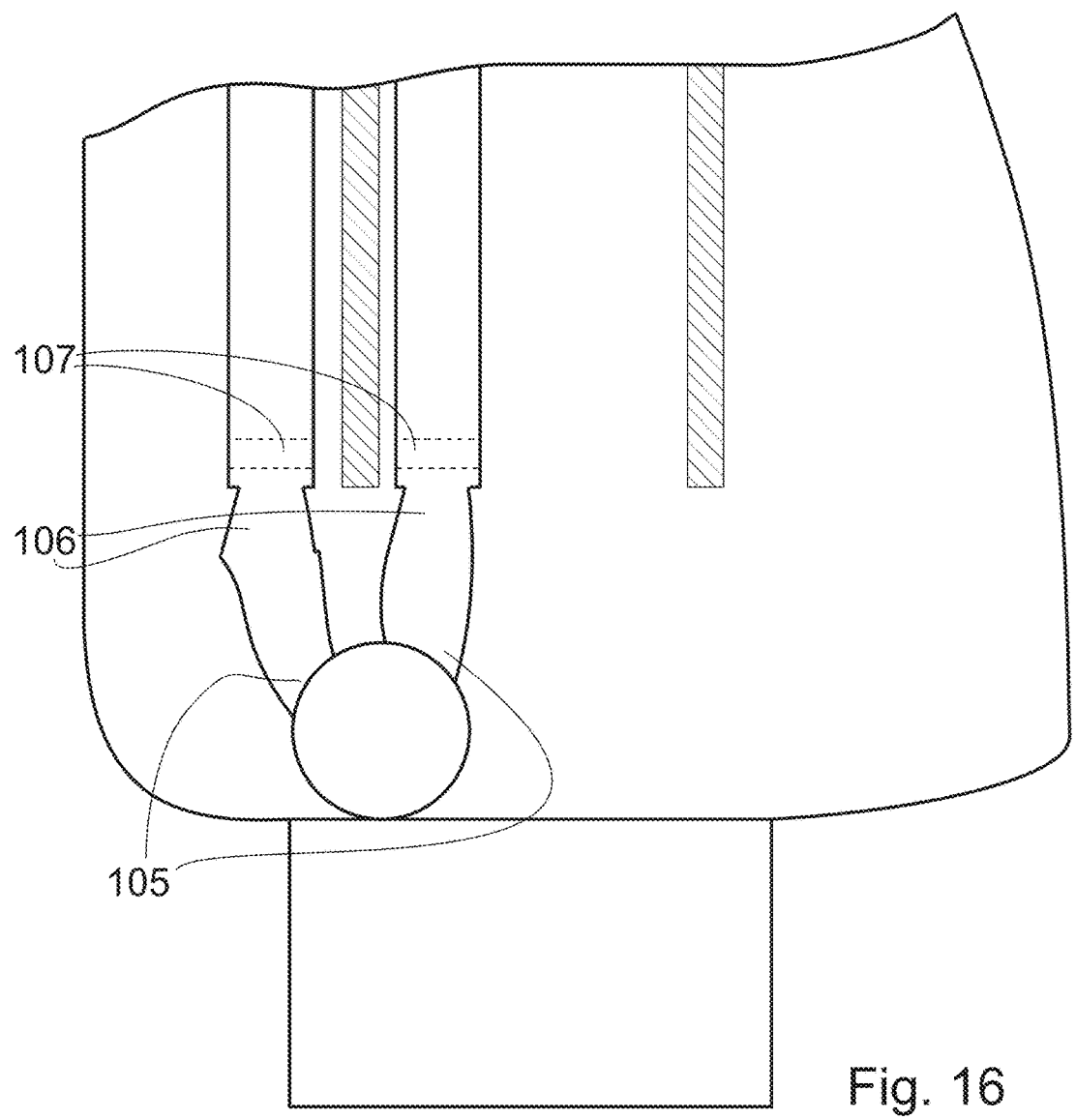
FIG. 16 illustrates a cross-sectional of the connections between elements of the de-icing system according to embodiments of the invention.

FIG. 16 illustrates an embodiment of the invention where the outflow- and return channels are connected to the heating- and circulation apparatus via flexible hoses (105) and reduction units (106). The flexible hoses provide room for relative movement of the channels with respect to the apparatus. Optionally, filtering units (107) may be installed in the outflow- and/or return channels to capture any debris present inside the blade.

Figure 17A:
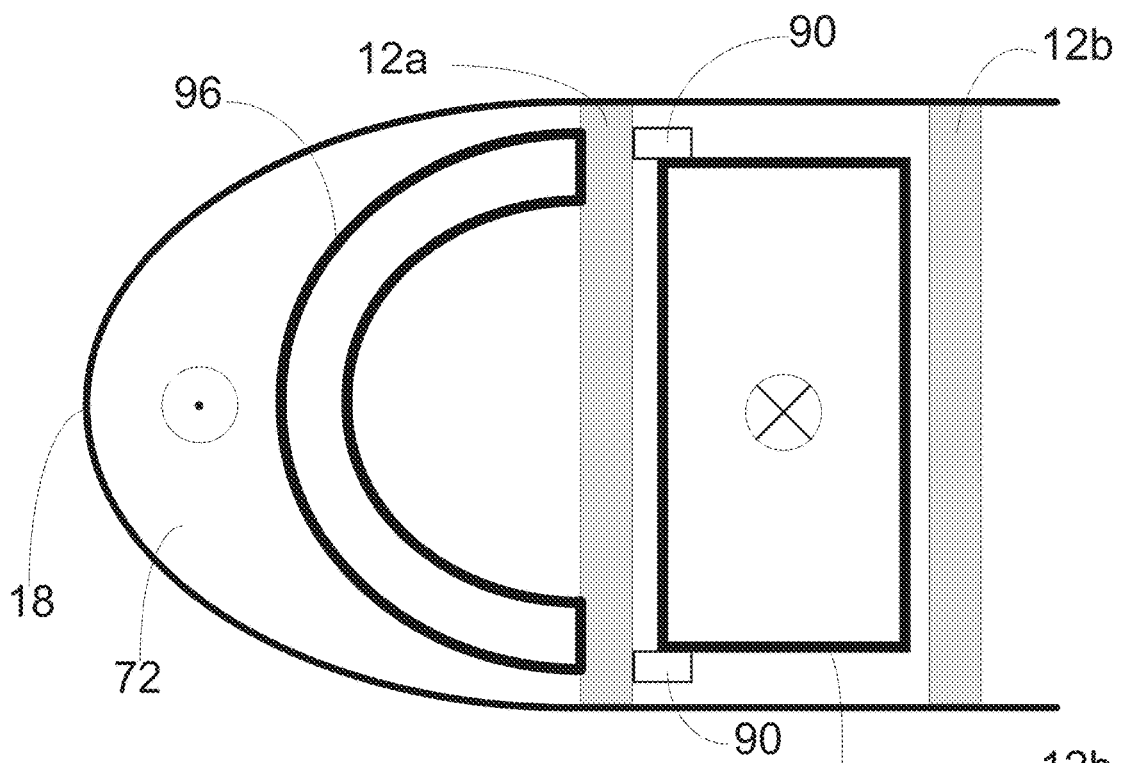
FIG. 17 illustrates a cross-sectional view of alternatives to the configurations of FIGS. 12(a) and 12(b) and 13.
Figure 17B:
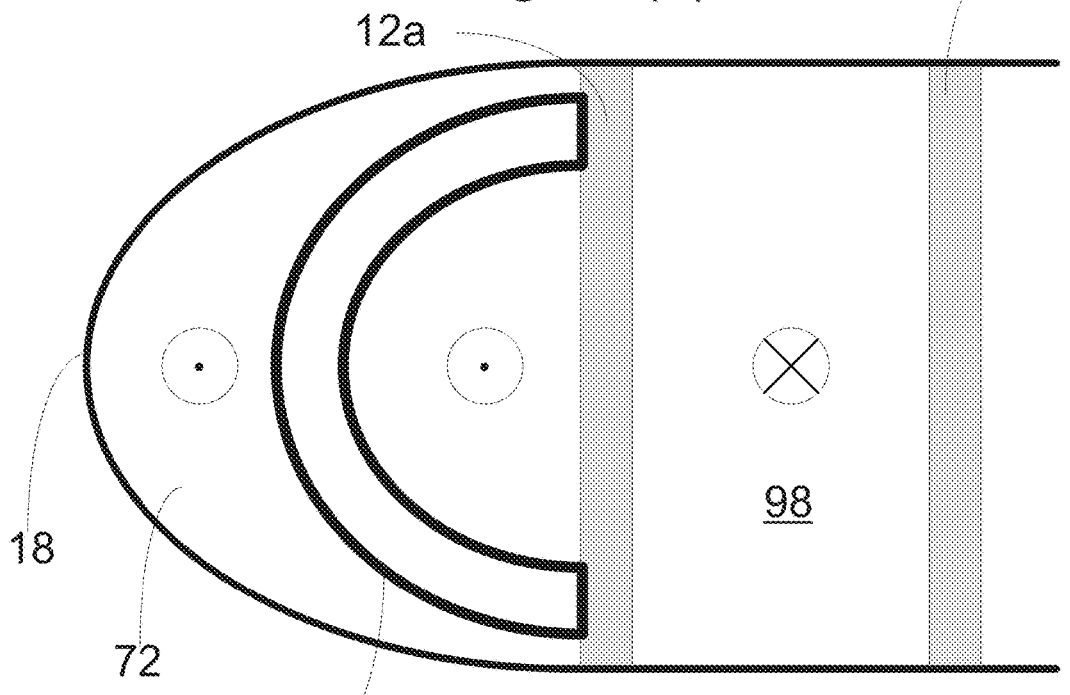

FIG. 17(a) illustrates how such a curved chamber may be used as an alternative to the configurations of FIGS. 12(a) and 12(b). FIG. 17(b) illustrates how the curved insulating wall 96 may provide an alternative for the configuration of FIG. 13, wherein the curved insulating wall 96 and the leading-edge-side shear web define a supplemental insulated flow channel to form a bypass channel for heated fluid.

In a further aspect of the invention, which may be implemented in any of the above embodiments, at least a portion of the outflow channel may be defined as the area between the shear webs 12a, 12b indicated at 98.

It will be understood that further enhancements and alternatives to the illustrated embodiments may be used. For example, a wind turbine may utilise a central heating and/or circulation apparatus as an alternative to separate apparatus 80 for each wind turbine blade. In this case, the heating and/or circulation apparatus may be provided in the hub or nacelle of the wind turbine and connected to the de-icing system of each wind turbine blade as appropriate. It will further be understood that the individual features of the above embodiments may be combined with those features of any other embodiments, to provide a de-icing system as described by the claims.

A wind turbine blade having a de-icing system as described delivers several advantages over the prior art. The invention provides a more efficient and effective de-icing system, which results in reduced stresses and strains and weight requirements for the overall wind turbine blade structure.

The invention is not limited to the embodiments described herein, and may be modified or adapted without departing from the scope of the present invention.

The invention claimed is:

1. A wind turbine blade (10) having a blade de-icing system, the wind turbine blade comprising a root end (16) and a tip end (14), a leading edge (18) and a trailing edge (20), the blade having an outboard portion provided towards said tip (14) end and an inboard portion provided towards said root end (16), the wind turbine blade (10) further comprising a blade shell structure forming an outer surface of the wind turbine blade (10), the blade de-icing system arranged to convey a heated fluid to provide heat to portions of the wind turbine blade, wherein the blade de-icing system comprises:
  an insulated outflow channel (70) flowing from said root (16) end to a location adjacent said tip (14) end;
  a heating channel (72) in the outboard portion of the blade, the heating channel flowing from said location adjacent said tip end (14) along the leading edge (18) of the blade in the outboard portion of blade, wherein said heating channel (72) comprises:
    an insulated wall arranged to define a leading edge cavity between said insulated wall and an internal surface of said blade shell structure at the leading edge of the wind turbine blade in said outboard portion; and
    flexible seal members arranged between respective upper and lower sides of said insulated wall and respective adjacent portions of the internal surface of said blade shell structure,
    wherein said insulated wall is supported by an internal shear web of said wind turbine blade, and
    wherein said flexible seal members are non-load carrying members and act to isolate forces associated with said insulated wall from the internal surface of said blade shell structure at said heating channel; and
  an insulated return channel (78) in the inboard portion of the blade, the insulated return channel (78) extending from the root end side of the heating channel to the root end of the blade,
  wherein said de-icing system is arranged to convey heated fluid from said root end (16) through said outflow channel (70) to said tip end (14), from said tip end (14) through said heating channel (72) to said insulated return channel (78), and from said insulated return channel (78) to said root end (16), said de-icing system configured to heat the leading edge (18) of the blade in said outboard portion of the blade.

2. The wind turbine blade of claim 1, wherein the heating channel (72) is arranged to heat the leading edge of the blade in said outboard portion of the blade, wherein the outboard portion comprises at least an outer two-thirds of the wind turbine blade towards the tip end (14).

3. The wind turbine blade of claim 2, wherein the outboard portion comprises at least an outer half of the wind turbine blade.

4. The wind turbine blade of claim 3, wherein the outboard portion comprises at least an outer one-third of the wind turbine blade.

5. The wind turbine blade of claim 1, wherein the wind turbine blade comprises at least one internal shear web (12a, 12b) extending between opposed internal surfaces of the wind turbine blade, wherein said insulated outflow channel is mounted solely to said at least one internal shear web, and/or said insulated return channel is mounted solely to said at least one internal shear web of said wind turbine blade.

6. The wind turbine blade according to claim 5, wherein said insulated outflow channel is formed having a decreasing cross-sectional area in the direction from said root end (16) towards said tip end (14),
  wherein said insulated outflow channel has a plurality of apertures (106) extending from said outflow channel to said heating channel (72), and wherein said insulated outflow channel is arranged on or near said at least one shear web (12a) and facing the leading edge (18).

7. The wind turbine blade according to claim 6, wherein the insulated outflow channel is formed having a substantially circular cross-section, the diameter of the insulated outflow channel being between 300 and 500 mm at the end facing the root end (16) and between 50 and 250 mm at the end facing the tip end (14).

8. The wind turbine blade according to claim 6, wherein the apertures (106) decrease with respect to their cross sectional area towards the tip end (14).

9. The wind turbine blade according to claim 8, wherein said insulated outflow channel and/or said insulated return cannel comprise filtering units (107).

10. The wind turbine blade of claim 5, wherein said insulated outflow channel (70) and/or said insulated return channel (78) is spaced from the internal surfaces of said blade shell structure.

11. The wind turbine blade of claim 1, wherein the heating channel (72) is arranged to heat an area of the surface of the wind turbine blade approximately 10% of the chord length of the blade from the leading edge of the wind turbine blade.

12. The wind turbine blade of claim 1, wherein said insulated outflow channel (70) is arranged between a leading edge shear web (12a) and a trailing edge shear web (12b) of a wind turbine blade.

13. The wind turbine of claim 12, wherein said insulated outflow channel is arranged in a space between said leading edge shear web (12a) and said trailing edge shear web (12b) in the outboard portion of the blade,
wherein heated fluid is conveyed to said heating channel through apertures (100) in said leading edge shear web (12a).

14. The wind turbine blade of claim 1, wherein the wind turbine blade comprises at least one diverter tube and/or fluid flow aperture provided as part of said de-icing system, wherein said at least one diverter tube and/or fluid flow aperture extends from said insulated outflow channel to said heating channel.

15. The wind turbine blade of claim 1, wherein the wind turbine blade comprises at least one diverter tube and at least one actuatable valve provided with at least one of said diverter tubes and/or fluid flow apertures, wherein said at least one actuatable valve is operable to control a flow of heated fluid from said insulated outflow channel to said heating channel.

16. The wind turbine blade of claim 15, wherein the at least one actuatable valve comprises at least one temperature-controlled valve.

17. The wind turbine blade according to claim 1, wherein a heating- and circulation apparatus (80) is connected to the outflow channel (70) by a flexible hose (105) and a reduction unit (106) and to the return channel (78) by a flexible hose (105) and a reduction unit (106), said flexible hoses (105) being connected to said heating- and circulation apparatus and said reduction units (106), said reduction units (106) being connected to the outflow- and return channels, respectively.

18. The wind turbine blade of claim 1, wherein said insulated outflow channel (70), and/or said insulated return channel (78), is formed from insulating panels, preferably low density foam panels, which are arranged to form a tube or box-like channel structure.

19. The wind turbine blade of claim 1, wherein said insulated outflow channel (70), and/or said insulated return channel (78), is formed from a flexible insulated material.

20. The wind turbine blade of claim 19, wherein said outflow channel (70) and/or said return channel (78), is formed as a double-walled inflatable tube, the tube comprising an inner tube arranged to convey a heated fluid and an outer tube, said inner tube located within the interior of said outer tube, an insulating cavity defined between said inner tube and said outer tube, wherein said insulating cavity in provided with an insulating fluid, to prevent heat loss from any heated fluid conveyed in said inner tube.

21. The wind turbine blade of claim 19, wherein the flexible insulated material comprises an impermeable flexible material.

22. The wind turbine blade of claim 21, wherein the impermeable flexible material is selected from the group consisting of rubber, latex, polychloroprene, nylon fabric, tarpaulin, and plastic sheeting.

23. The wind turbine blade of claim 1, wherein the blade de-icing system further comprises at least one baffle (71, 74) provided in said heating channel, to re-direct a portion of a flow of heated fluid in said heating channel.

24. The wind turbine blade of claim 23, wherein said insulated outflow channel (70) is communicatively coupled with said heating channel at said tip end (14), wherein said at least one baffle (74) defines at least one supplementary channel in said heating channel, wherein said at least one supplementary channel extends to a secondary location in said heating channel to divert a portion of a flow of heated fluid from said insulated outflow channel to said secondary location in said heating channel.

25. A wind turbine comprising at least one wind turbine blade as claimed in claim 1.

* * * * *